(12) United States Patent
Hollands et al.

(10) Patent No.: US 11,740,460 B2
(45) Date of Patent: Aug. 29, 2023

(54) OPTICAL SYSTEMS WITH MULTI-LAYER HOLOGRAPHIC COMBINERS

(71) Applicant: Apple Inc., Cupertino, CA (US)

(72) Inventors: Matthew D. Hollands, London (GB); Michael D. Simmonds, Kent (GB); Richard J. Topliss, Cambridge (GB); Thomas M. Gregory, Cambridgeshire (GB)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 16/688,831

(22) Filed: Nov. 19, 2019

(65) Prior Publication Data

US 2020/0174255 A1    Jun. 4, 2020

Related U.S. Application Data

(60) Provisional application No. 62/772,985, filed on Nov. 29, 2018.

(51) Int. Cl.
   *G02B 27/01* (2006.01)

(52) U.S. Cl.
   CPC ..... *G02B 27/0172* (2013.01); *G02B 27/0103* (2013.01); *G02B 2027/013* (2013.01); *G02B 2027/0105* (2013.01); *G02B 2027/0123* (2013.01); *G02B 2027/0174* (2013.01); *G02B 2027/0178* (2013.01)

(58) Field of Classification Search
   CPC .. G03H 1/0248; G03H 1/0256; G03H 1/0252; G03H 2250/42; G03H 2250/10; G03H 2223/24; G03H 2223/23; G03H 2223/17
   See application file for complete search history.

(56) References Cited

U.S. PATENT DOCUMENTS

| | | |
|---|---|---|
| 7,418,170 B2 | 8/2008 | Mukawa et al. |
| 9,366,862 B2 | 6/2016 | Haddick et al. |
| 10,394,029 B2 | 8/2019 | Ayres et al. |

(Continued)

FOREIGN PATENT DOCUMENTS

| | | |
|---|---|---|
| CN | 106471428 A | 3/2017 |
| CN | 107063999 A | 8/2017 |

(Continued)

*Primary Examiner* — Jennifer D. Carruth
(74) *Attorney, Agent, or Firm* — Treyz Law Group, P.C.; Michael H. Lyons

(57) ABSTRACT

An electronic device may include a display module that generates image light and an optical system that redirects the light towards an eye box. The optical system may have first hologram structures that replicate the light over multiple output angles onto second hologram structures. The second hologram structures may focus the replicated light onto the eye box. If desired, the device may include an image sensor. The first and second hologram structures may include transmission and/or reflection holograms. The optical system may redirect a first portion of the light to the eye box and a second portion of the light to the sensor. The sensor may generate image data based on the second portion of the light. Control circuitry may compensate for distortions in the first portion of the light by performing feedback adjustments to the display module based on distortions in the image data.

30 Claims, 18 Drawing Sheets

(56) References Cited

U.S. PATENT DOCUMENTS

| | | |
|---|---|---|
| 10,444,507 B2 | 10/2019 | Urey |
| 2009/0103415 A1* | 4/2009 | Usami ................ G11B 7/00781 |
| 2012/0105806 A1 | 5/2012 | Kuo et al. |
| 2012/0224062 A1 | 9/2012 | Lacoste et al. |
| 2014/0140654 A1 | 5/2014 | Brown et al. |
| 2015/0268467 A1 | 9/2015 | Cakmakci et al. |
| 2016/0327797 A1* | 11/2016 | Bailey ................. G03H 1/2645 |
| 2017/0285348 A1 | 10/2017 | Tyres et al. |
| 2018/0149874 A1* | 5/2018 | Aleem ................ H04N 9/3129 |
| 2018/0246354 A1* | 8/2018 | Popovich ............. G02F 1/1334 |
| 2019/0101760 A1 | 4/2019 | Tyres et al. |
| 2019/0187482 A1 | 6/2019 | Lanman |

FOREIGN PATENT DOCUMENTS

| | | |
|---|---|---|
| CN | 108351614 A | 7/2018 |
| WO | 2017222808 A1 | 12/2017 |
| WO | 2018/146326 A2 | 8/2018 |

\* cited by examiner

OPTICAL SYSTEMS WITH MULTI-LAYER HOLOGRAPHIC COMBINERS This application claims the benefit of provisional patent application No. 62/772,985, filed Nov. 29, 2018, which is hereby incorporated by reference herein in its entirety.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates image light and an optical system that redirects the image light from the display unit towards an eye box. The optical system may be, for example, a multi-layer holographic combiner. The optical system may have first hologram structures and second hologram structures overlapping the first hologram structures. The first hologram structures may receive the image light at angles external to a volume between the first and second hologram structures. The first hologram structures may be configured to replicate the image light from multiple incident angles over multiple output angles onto the second hologram structures. The second hologram structures may focus the replicated image light onto the eye box.

In one suitable arrangement, the first hologram structures include transmission holograms and the second hologram structures include reflection holograms. In another suitable arrangement, the first hologram structures include reflection holograms and the second hologram structures include transmission holograms. In yet another suitable arrangement, both the first and second hologram structures include reflection holograms. The optical system may occupy relatively little space within the device, may exhibit a relatively large field of view, may have non-planar shapes, may replicate an image across the eye box such that no perspective change is observed by a user as their eye transitions through the eye box (e.g., for a wide range of user physiologies), and may allow rendering of virtual objects at any depth from the user, as examples.

If desired, the device may include an image sensor. The optical system may redirect a first portion of the image light to the eye box and a second portion of the image light to the image sensor. The image sensor may generate image data based on the second portion of the image light. Control circuitry may identify distortions in the image data indicative of a change in position of the optical system relative to the display module. The distortions may be, for example, distortions that are present from the user's perspective at the eye box. The control circuitry may compensate for these distortions by performing feedback adjustments to the image light projected by the display module based on the identified change in position.

DETAILED DESCRIPTION

Figure 1:
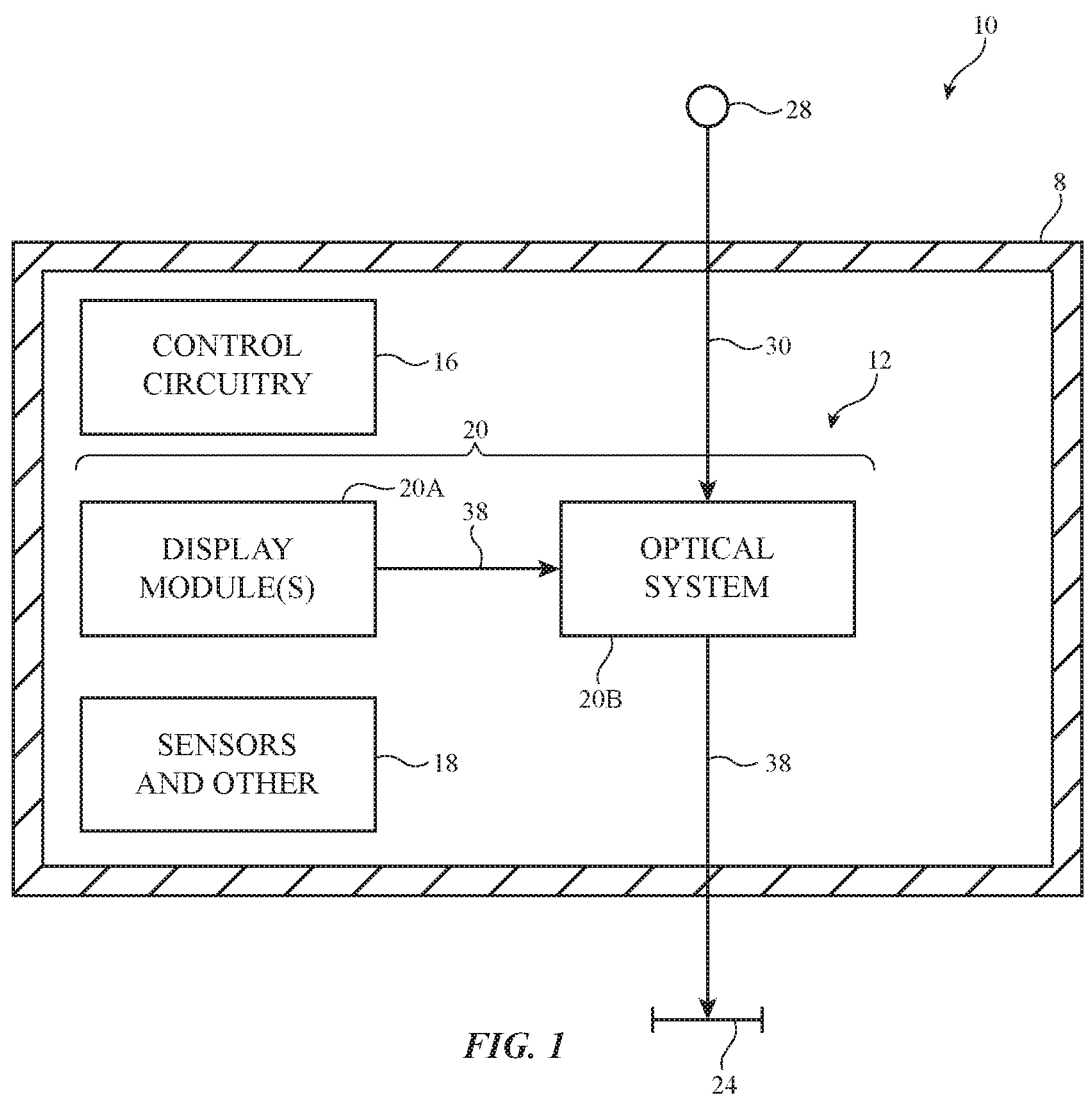
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 20 mounted within support structure (housing) 8. Support structure 8 may have the shape of a pair of eyeglasses (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 (e.g., non-transitory computer readable media) and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may include liquid crystal displays, organic light-emitting diode displays, laser-based displays, microelectromechanical system (MEMS)-based displays, digital micromirror device (DMD) displays, liquid crystal on silicon (LCoS) displays, computer-generated holography (CGH) displays, or displays of other types, as well as optical components used to support the displays. Display modules 20A may sometimes be referred to herein as projectors 20A. Display modules 20A may produce (project) image light 38. Optical systems 20B may include lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by components in optical system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light 30 from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 28 and this content is digitally merged with virtual content at optical system 20B). In one suitable arrangement that is described herein by example, the optical combiner in optical system 20B includes a multi-layer holographic combiner.

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

In some scenarios, a waveguide is used to form an optical combiner in optical system 20B. In these scenarios, the waveguide may be subject to total internal reflection and field of view limits, may limit the geometry of optical system 20B to planar arrangements, and may exhibit undesirable light field capability for rendering virtual objects at any depth from the user's eye (e.g., for solving accommodation-vergence mismatch). In other scenarios, semi-reflective combiners such as ellipsoid mirrors are formed in optical system 20B. However, combiners of this type are often undesirably bulky and may also exhibit undesirable light field capability for rendering virtual objects at any depth from the user's eye.

Figure 2:
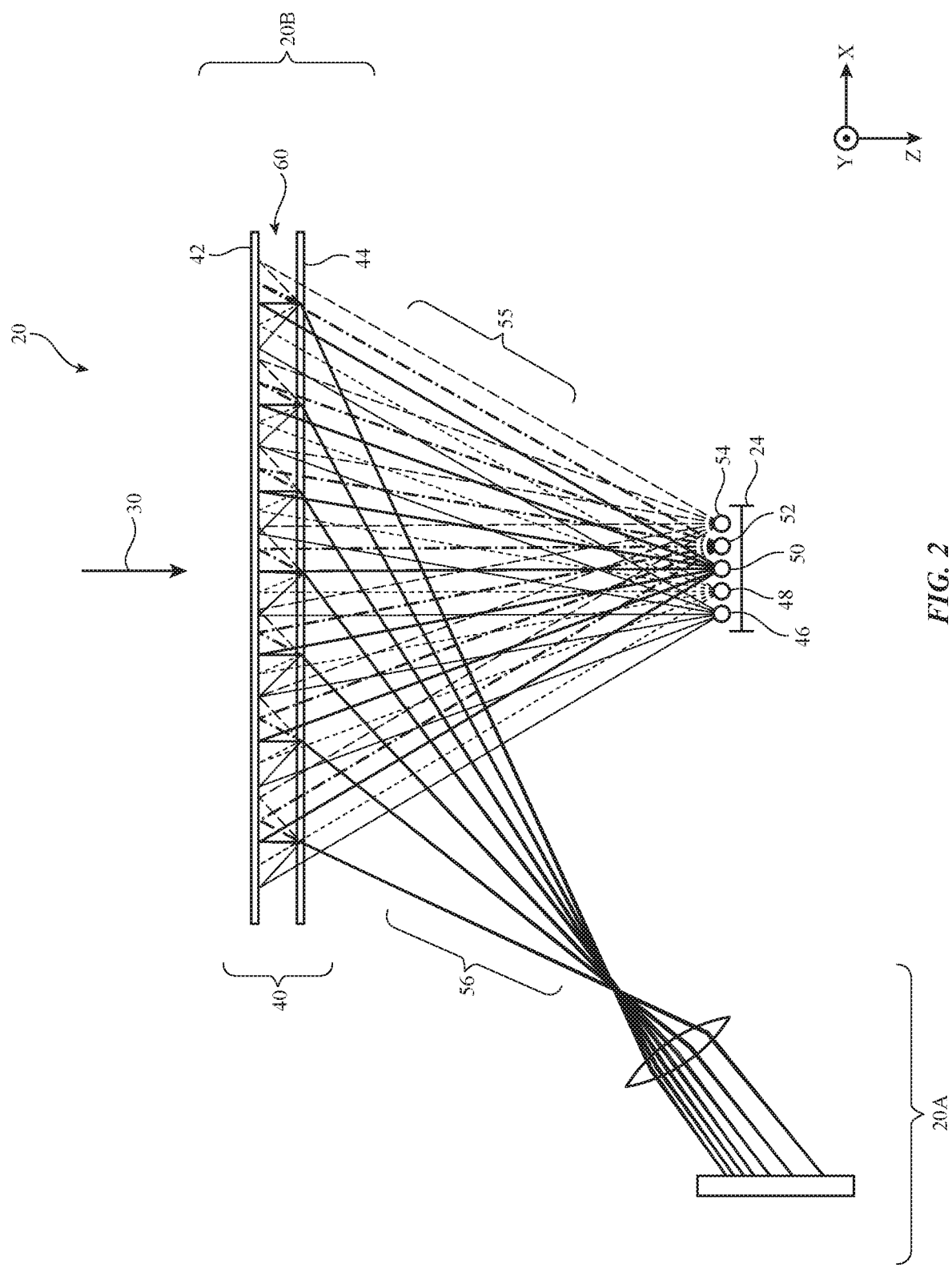
FIG. 2 is a diagram of an illustrative display system having a multi-layer holographic combiner with transmission hologram structures for replicating an external image and reflection hologram structures for focusing each replicated image onto an eye box in accordance with some embodiments.

In order to mitigate these issues, optical system 20B may include a multi-layer holographic combiner. FIG. 2 is a diagram showing how a multi-layer holographic combiner may be used to redirect light from display module 20A to eye box 24. As shown in FIG. 2, optical system 20B may include multi-layer holographic combiner 40. Display module 20A may project input light 56 towards multi-layer holographic combiner 40. Multi-layer holographic combiner 40 may serve to redirect this light towards eye box 24, as shown by output light 55.

A holographic recording may be stored as an optical interference pattern (e.g., alternating regions of different indices of refraction) within a photosensitive optical material. The photosensitive optical material may include volume holographic media such as photopolymers, gelatin such as dichromated gelatin, silver halides, holographic polymer dispersed liquid crystal, or other suitable volume holographic media. The optical interference pattern may create a holographic grating that, when illuminated with a given light source, diffracts light to create a three-dimensional reconstruction of the holographic recording. The diffractive grating may be a non-switchable diffractive grating that is encoded with a permanent interference pattern, as an example.

Multi-layer holographic combiner 40 may include multiple layers of material that are recorded with holographic (diffractive) gratings. Each grating may sometimes be referred to herein as a hologram (e.g., a volume hologram). For example, multi-layer holographic combiner 40 may include transmission hologram structures 44 and reflection hologram structures 42. Transmission hologram structures 44 (sometimes referred to herein as transmission grating structures 44) may include one or more layers of holographic medium (e.g., thick layers of holographic medium, films, coatings, etc.) that are recorded with a set of transmission holograms. Reflection hologram structures 42 (sometimes referred to herein as reflection grating structures 42) may include one or more layers of holographic medium that are recorded with a set of reflection holograms.

Display module 20A may project light 56 onto transmission hologram structures 44 from a location (angle) external to the volume between reflection hologram structures 42 and transmission hologram structures 44 (e.g., light 56 may be incident on multi-layer holographic combiner 40 from a direction external to the volume between the transmission and reflection hologram structures). This may, for example, eliminate the need for implementing a waveguide between the transmission and reflection hologram structures. Forming multi-layer holographic combiner 40 without a waveguide may eliminate total internal reflection-based limitations on the display. Display module 20A may include any desired structures for projecting light onto multi-layer holographic combiner 40. In the example of FIG. 2, display module 20A is shown as including a micro display and projector optics (e.g., a lens) for projecting light 56. This is merely illustrative. In other suitable arrangements, display module 20A may include a liquid crystal display, an organic light-emitting diode display, a laser-based display, a micro-electromechanical system (MEMS)-based display (e.g., a display that implements one or more MEMs scanning mirrors or other MEMS scanning technologies), a digital micromirror device (DMD) display, a liquid crystal on silicon (LCoS) display, a computer-generated holography (CGH) display, or displays of other types.

Transmission hologram structures 44 may serve to replicate an input image (e.g., an image conveyed by light 56) at each input ray angle towards reflection hologram structures 42 at multiple different output angles, as shown by light 60 (e.g., transmission hologram structures 44 may serve to split light 56 into multiple beams of light 60 transmitted at different output angles towards reflection hologram structures 42). Reflection hologram structures 42 may serve to focus the replicated images transmitted by transmission hologram structures 44 onto eye box 24, as shown by reflected light 55.

By replicating the input image using transmission hologram structures 44, multiple replicas of the input image may be focused onto eye box 24 by reflection hologram structures 42, as shown in FIG. 2 by pupils 46, 48, 50, 52, and 54. In this way, the same image may be replicated at each of pupils 46, 48, 50, 52, and 54 within eye box 24, with light 55 forming parallel beams to each of the pupils. This may allow the user to move their eye (e.g., via translation and/or rotation) within eye box 24 without losing the image or generating a shift in perspective to the image (e.g., each of pupils 46, 48, 50, 52, and 54 may offer the same perspective at eye box 24).

When configured in this way, display system 20 may exhibit minimal size, weight, and power consumption (e.g., relative to scenarios where semi-reflective combiners are used) while also exhibiting a relatively large field of view (e.g., relative to scenarios where waveguide combiners that would otherwise be subject to total internal reflection limits are used). Similarly, the absence of a waveguide between transmission hologram structures 44 and reflection hologram structures 42 may allow design freedom in the geometry of multi-layer holographic combiner 40 (e.g., allowing combiner 40 to accommodate other shapes such as curved shapes). In addition, multi-layer holographic combiner 40 may fill eye box 24 with light (e.g., pupils 46, 48, 50, 52, and 54) to allow a user to properly view the projected image regardless of the user's facial geometry, pupil diameter, and interpupillary distance, may replicate the image across the eye box such that no perspective change is observed by the user as their eye transitions through the eye box, and may allow rendering of virtual objects at any desired depth from the user (e.g., thus solving accommodation-vergence mismatch). Multi-layer holographic combiner 40 may also pass real world light 30 to eye box 24 (e.g., for overlaying real world and virtual images).

Figure 3:
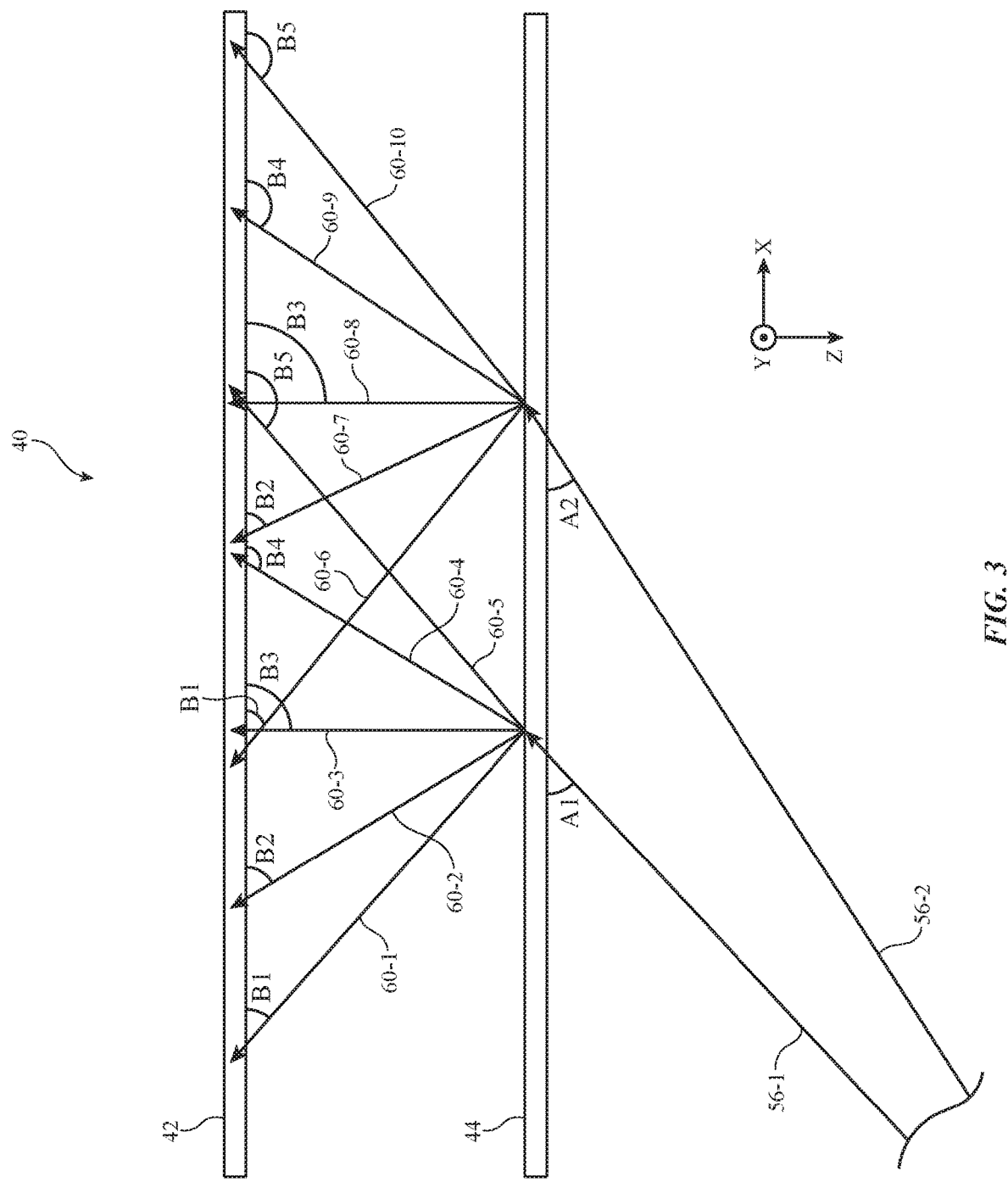
FIG. 3 is a diagram showing the operation of illustrative transmission hologram structures in a multi-layer holographic combiner in accordance with some embodiments.

FIG. 3 is a diagram showing how transmission hologram structures 44 may replicate each ray angle from input light 56 towards reflection hologram structures 42. In the example of FIG. 3, two illustrative rays 56-1 and 56-2 of input light 56 (FIG. 2) are shown for the sake of clarity. Ray 56-1 hits transmission hologram structures 44 at incident angle A1 whereas ray 56-2 hits transmission hologram structures 44 at incident angle A2. Transmission hologram structures 44 may replicate ray 56-1 and ray 56-2 at one or more output angles (e.g., as shown by light 60).

The transmission holograms in transmission hologram structures 44 may be configured to diffract light from different incident angles and wavelengths at corresponding output angles. The spacing (frequency) of the grating used to form each hologram (e.g., the spacing in refractive index modulations in the holographic medium used to form structures 44) configures that hologram to diffract light of a given wavelength and from a given incident angle at a corresponding output angle (e.g., when the input light is Bragg-matched to the grating). The set of transmission holograms used to form transmission hologram structures 44 may include any desired number of holograms (gratings) having corresponding grating frequencies and orientations (e.g., for diffracting incident light at any desired number of incident angles and wavelengths at any desired number of output angles). Each transmission hologram in the set may be superimposed on the same volume of holographic medium or different transmission holograms in the set may be formed in any desired number of discrete layers.

In the illustrative example of FIG. 3, the set of holograms in transmission hologram structures 44 include a first transmission hologram configured to diffract light from incident angle A1 (e.g., ray 56-1) at output angle B1 (as shown by ray 60-1), a second transmission hologram configured to diffract light from incident angle A1 at output angle B2 (as shown by ray 60-2), a third transmission hologram configured to diffract light from incident angle A1 at output angle B3 (as shown by ray 60-3), a fourth transmission hologram configured to diffract light from incident angle A1 at output angle B4 (as shown by ray 60-4), and a fifth transmission hologram configured to diffract light from incident angle A1 at output angle B5 (as shown by ray 60-5). In this way, transmission hologram structures 44 may split ray 56-1 into five replicated beams that are transmitted towards reflection hologram structures 42.

At the same time, the first transmission hologram in transmission hologram structures 44 may diffract light from incident angle A2 (e.g., ray 56-2) at output angle B1 (as shown by ray 60-6), the second transmission hologram may diffract light from incident angle A2 at output angle B2 (as shown by ray 60-7), the third transmission hologram may diffract light from incident angle A2 at output angle B3 (as shown by ray 60-8), the fourth transmission hologram may diffract light from incident angle A2 at output angle B4 (as shown by ray 60-9), and the fifth transmission hologram may diffract light from incident angle A2 at output angle B5 (as shown by ray 60-10). In this way, transmission hologram structures 44 may split ray 56-2 into five replicated rays that are transmitted towards reflection hologram structures 42. This example is merely illustrative and, in general, transmission hologram structures 44 may include any desired number of holograms for splitting rays 56-1 and 56-2 over any desired number of output angles.

The first through fifth transmission holograms may be superimposed with each other across the entire length of transmission hologram structures 44 if desired. In another possible arrangement, the first through fifth transmission holograms may be recorded in partially overlapping or non-overlapping regions of transmission hologram structures 44. These transmission holograms or additional transmission holograms in transmission hologram structures 44 may be configured in this manner for replicating (splitting) the incident light from any desired number of incident angles (e.g., across the field of view of the projector) at output angles B1, B2, B3, B4, and B5. This may serve to replicate pupils that are focused onto eye box 24 (FIG. 2) by reflection hologram structures 42. In the example of FIG. 3, operation on light of a single wavelength is shown for the sake of clarity. If desired, the number of holograms in transmission hologram structures 44 may be multiplied for each wavelength of light that is projected onto multi-layer holographic combiner 40 (e.g., the transmission holograms may be color multiplexed).

Figure 4:
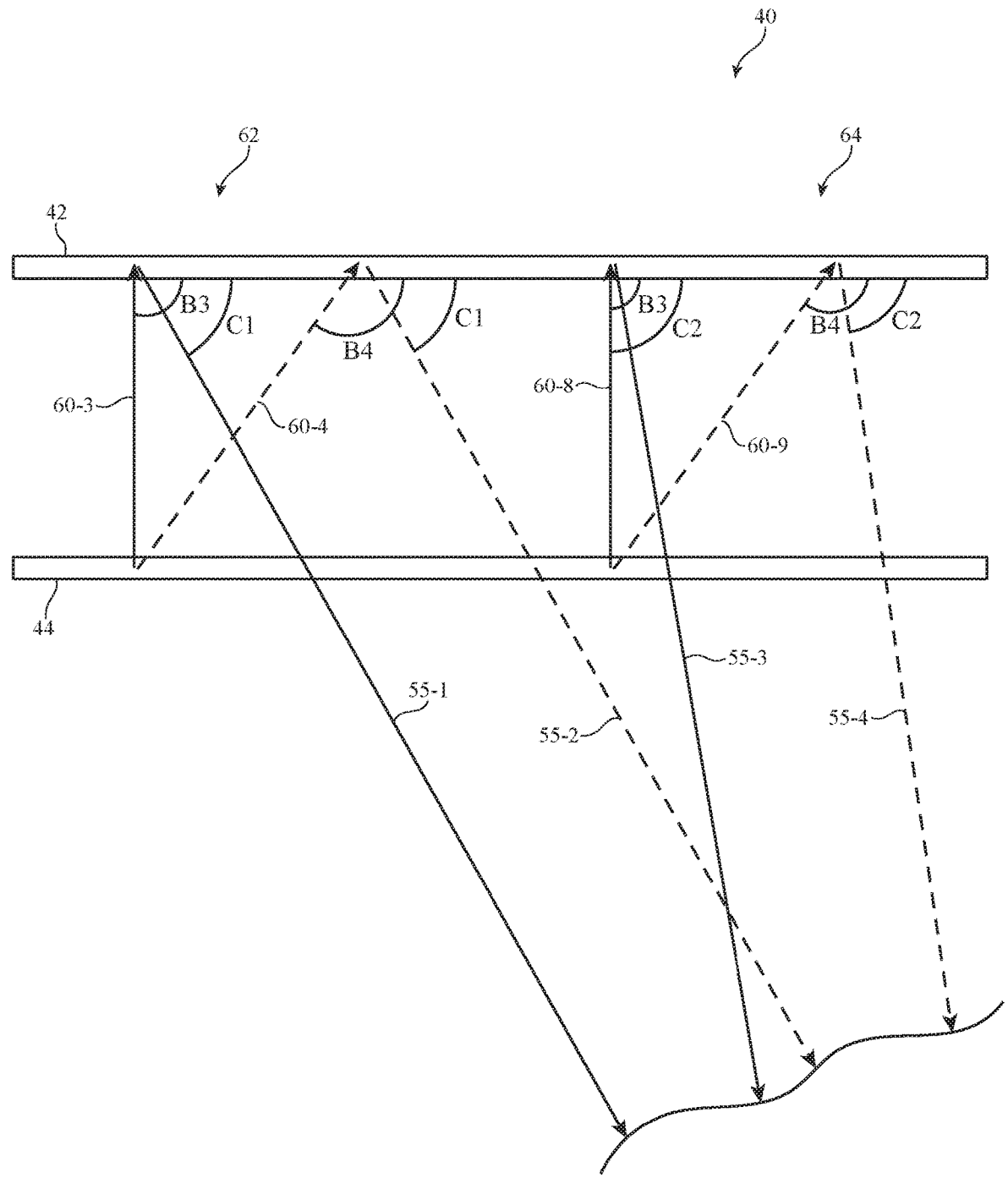
FIG. 4 is a diagram showing the operation of illustrative reflection hologram structures in a multi-layer holographic combiner in accordance with some embodiments.

FIG. 4 is a diagram showing how reflection hologram structures 42 may focus the light replicated by transmission hologram structures 44 towards eye box 24 (FIG. 2). The example of FIG. 4 only shows the operation of reflection hologram structures 44 on diffracted rays 60-3, 60-4, 60-8, and 60-9 of FIG. 3 for the sake of clarity. In general, reflection hologram structures 42 may include additional holograms for handling each diffracted ray from transmission hologram structures 44.

The reflection holograms in reflection hologram structures 42 may be configured to diffract light from different incident angles and wavelengths at corresponding output angles. The spacing (frequency) of the grating used to form each hologram (e.g., the spacing in refractive index modulations in the holographic medium used to form structures 42) configures that hologram to diffract light of a given wavelength and from a given incident angle at a corresponding output angle (e.g., when the input light is Bragg-matched to the grating). The set of reflection holograms used to form reflection hologram structures 44 may include any desired number of holograms (gratings) having corresponding grating frequencies and orientations (e.g., for diffracting incident light at any desired number of incident angles and wavelengths at any desired number of output angles). Each reflection hologram in the set may be superimposed on the same volume of holographic medium or different reflection holograms in the set may be formed in any desired number of discrete layers.

In the illustrative example of FIG. 4, the set of holograms in reflection hologram structures 42 include a first reflection hologram in region 62 that is configured to diffract light from incident angle B3 (e.g., ray 60-3) at output angle C1 (as shown by ray 55-1) and a second reflection hologram in region 62 that is configured to diffract light from incident angle B4 (e.g., ray 60-4) at output angle C1 (e.g., towards eye box 24 of FIG. 2). While not shown in the example of FIG. 4 for the sake of clarity, additional reflection holograms may be recorded in region 62 for diffracting rays 60-1, 60-2, and 60-5 of FIG. 3 at output angle C1. Similarly, the set of holograms in reflection hologram structures 42 may include a first reflection hologram in region 64 that is configured to diffract light from incident angle B3 (e.g., ray 60-8) at output angle C2 (as shown by ray 55-3) and a second reflection hologram in region 64 that is configured to diffract light from incident angle B4 (e.g., ray 60-9) at output angle C2 (e.g., towards eye box 24 of FIG. 2). While not shown in the example of FIG. 4 for the sake of clarity, additional reflection holograms may be recorded in region 64 for diffracting rays 60-6, 60-7, and 60-10 of FIG. 3 at output angle C2. Regions 62 and 64 may, for example, be defined by the widest diffraction angle of structures 42 and 44. Holograms in region 62 may overlap with holograms in region 64 if desired.

In this way, each replicated ray from incident ray 56-1 of FIG. 3 may be diffracted towards eye box 24 in parallel by the reflection holograms in region 62 and each replicated ray from incident ray 56-2 of FIG. 3 may be diffracted towards eye box 24 in parallel (e.g., for focusing pupils 46, 48, 50, 52, and 54 of FIG. 2 on eye box 24). Additional holograms may be formed in additional regions of reflection hologram structures 42 for diffracting the light replicated by transmission hologram structures 44 from each incident angle of input light 56. This may serve to replicate the displayed image across the eye box such that no perspective change is observed by the user as their eye transitions or shifts through the eye box. In the example of FIG. 4, operation on light of a single wavelength is shown for the sake of clarity. If desired, the number of holograms in reflection hologram structures 42 may be multiplied for each wavelength of light that is projected onto multi-layer holographic combiner 40.

The holograms used to form multi-layer holographic combiner 40 may operate on light having any desired wave front shape. As one example, the transmission holograms used to form transmission hologram structures 44 may each be plane-wave-to-plane-wave transmission holograms, point-to-plane-wave transmission holograms, or point-to-nearly-plane-wave transmission holograms. Similarly, the reflection holograms used to form reflection hologram structures 42 may each be plane-wave-to-plane-wave reflection holograms, point-to-plane-wave reflection holograms, or point-to-nearly-plane-wave reflection holograms.

Figure 5:
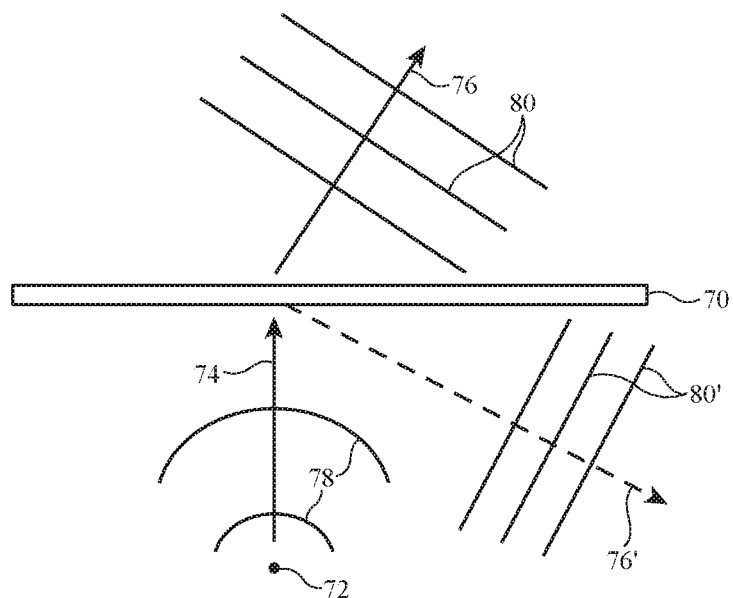
FIG. 5 is a diagram showing the operation of an illustrative point-to-plane-wave hologram that may be used in transmission hologram structures and/or reflection hologram structures in accordance with some embodiments.

FIG. 5 is a diagram of illustrative point-to-plane-wave holograms that may be used in implementing transmission hologram structures 44 and/or reflection hologram structures 42. As shown in FIG. 5, a holographic recording (grating) medium such as medium 70 may include a corresponding hologram. A point light source 72 may provide incident light towards medium 70 in direction 74. The incident light 78 may exhibit spherical wave fronts propagating outwards from point source 72. In scenarios where a point-to-plane-wave transmission hologram is recorded on medium 70 (e.g., in scenarios where medium 70 of FIG. 5 is used to form transmission hologram structures 44 of FIGS. 2-4), the point-to-plane-wave transmission hologram will diffract incident light 78 into an output angle at the opposing side of medium 70, as shown by arrow 76. The diffracted light exhibits parallel (planar) wave fronts 80 (e.g., the hologram serves to diffract incident spherical wave fronts into outgoing parallel wave fronts).

In scenarios where a point-to-plane-wave reflection hologram is recorded on medium 70 (e.g., in scenarios where medium 70 of FIG. 5 is used to form reflection hologram structures 42 of FIGS. 2-4), the point-to-plane-wave reflection hologram will diffract incident light 78 into an output angle at the same side of medium 70 as the incident light, as shown by arrow 76'. The diffracted light exhibits parallel (planar) wave fronts 80' (e.g., the hologram serves to diffract incident spherical wave fronts into outgoing parallel wave fronts). When configured in this way, the hologram itself exhibits optical power (e.g., optical power that could otherwise be provided with a curved, refractive optical surface but without requiring the space necessary to implement a curved, refractive optical surface).

Figure 6:
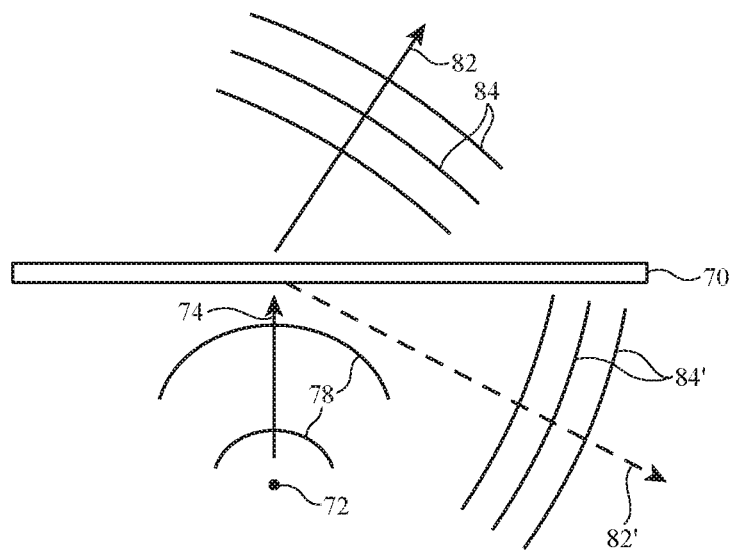
FIG. 6 is a diagram showing the operation of an illustrative point-to-nearly-plane-wave hologram that may be used in transmission hologram structures and/or reflection hologram structures in accordance with some embodiments.

FIG. 6 is a diagram of illustrative point-to-nearly-plane-wave holograms that may be used in implementing transmission hologram structures 44 and/or reflection hologram structures 42. In scenarios where a point-to-nearly-plane-wave transmission hologram is recorded on medium 70 (e.g., in scenarios where medium 70 of FIG. 6 is used to form transmission hologram structures 44 of FIGS. 2-4), the point-to-nearly-plane-wave transmission hologram will diffract incident light 78 into an output angle at the opposing side of medium 70, as shown by arrow 82. The diffracted light exhibits nearly-parallel (nearly-planar) wave fronts 80 (e.g., the hologram serves to diffract incident spherical wave fronts into outgoing nearly-parallel wave fronts). The point-to-nearly-plane-wave holograms may, for example, be point-to-plane-wave holograms but, to compensate for aberrations in the display system, may modify the diffracted wave front so that it is not exactly a planar wave front.

In scenarios where a point-to-nearly-plane-wave reflection hologram is recorded on medium 70 (e.g., in scenarios where medium 70 of FIG. 5 is used to form reflection hologram structures 42 of FIGS. 2-4), the point-to-nearly-plane-wave reflection hologram will diffract the incident light into an output angle at the same side of medium 70 as the incident light, as shown by arrow 82'. The diffracted light exhibits nearly-parallel (nearly-planar) wave fronts 84' (e.g., the hologram serves to diffract incident spherical wave fronts into outgoing nearly-parallel wave fronts). When configured in this way, the hologram itself exhibits optical power (e.g., optical power that would otherwise be provided with a curved, refractive optical surface). The optical power of the holograms may be tuned to adjust the shapes of the outgoing wave fronts relative to the incoming wave fronts.

The examples of FIGS. 5 and 6 illustrate replay of holograms written to medium 70. Similar light sources (e.g., plane wave light sources, nearly-plane-wave light sources, and point light sources) may be used to record the holograms on medium 70. The examples of FIGS. 5 and 6 are merely illustrative. In another suitable arrangement, the holograms may be plane-wave-to-plane wave holograms (e.g., holograms that diffract incoming parallel wavefronts into outgoing parallel wave fronts), plane-wave-to-point holograms (e.g., holograms that diffract incoming parallel wave fronts into outgoing spherical wave fronts), nearly-plane-wave-to-point holograms (e.g., holograms that diffract nearly-parallel wave fronts into outgoing spherical wave fronts), etc. In general, the holograms used to form multi-layer holographic combiner 40 may diffract incoming light having any desired wave fronts into outgoing light having any desired wave fronts.

In one suitable arrangement, as an example, transmission hologram structures 44 include point-to-plane-wave holograms, point-to-nearly-plane-wave holograms, or plane-wave-to-plane-wave holograms whereas reflection hologram structures 42 include plane-wave-to-point holograms or nearly-plane-wave-to-point holograms. This is merely illustrative and, in general, any desired wave fronts may be used.

Figure 7:
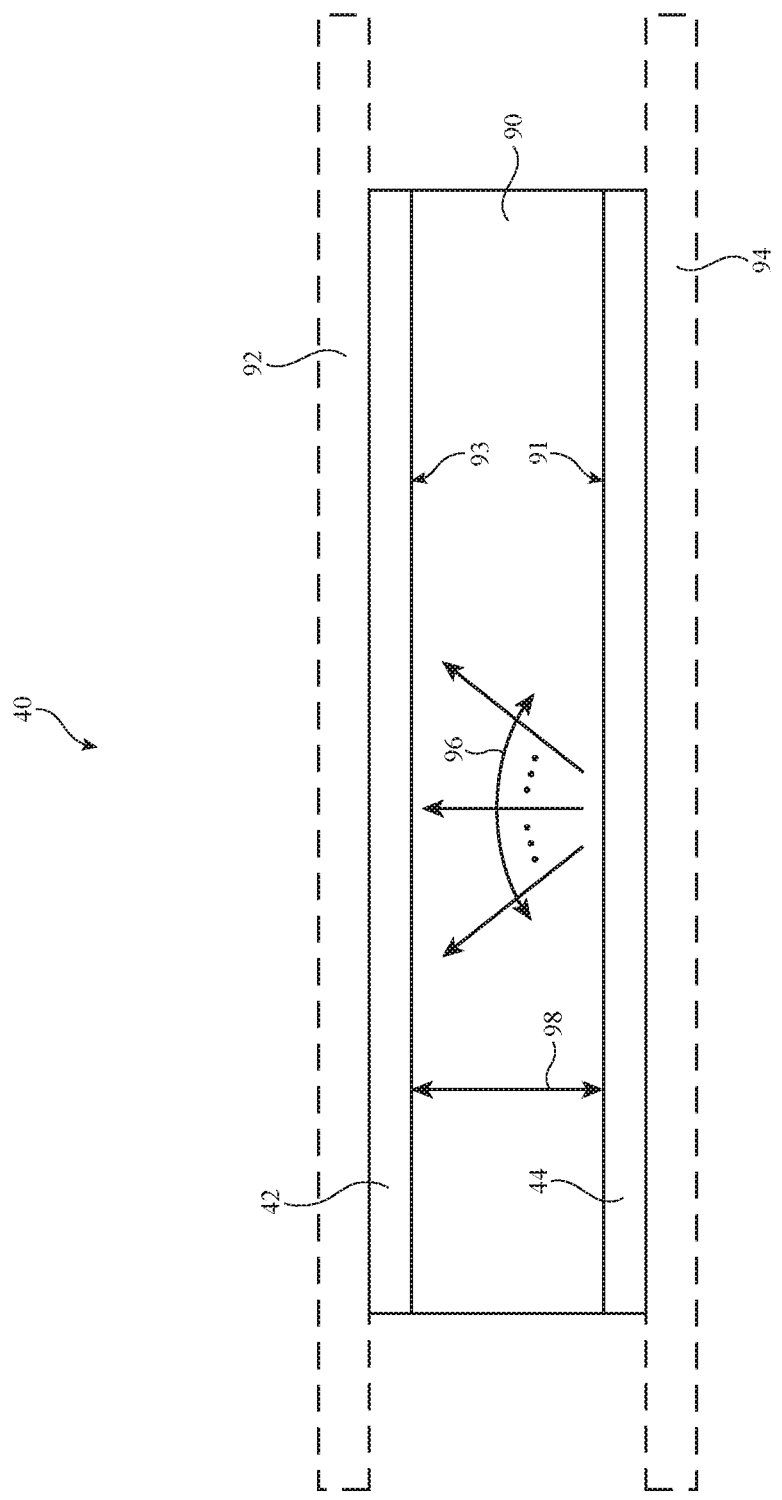
FIG. 7 is a diagram of an illustrative multi-layer holographic combiner having one or more substrates in accordance with some embodiments.

In the examples of FIGS. 2-4, multi-layer holographic combiner 40 is illustrated without any substrate between transmission hologram structures 44 and reflection hologram structures 42 for the sake of clarity. If desired, a substrate may be formed between transmission hologram structures 44 and reflection hologram structures 42. FIG. 7 is a diagram showing how multi-layer holographic combiner 40 may include one or more substrates for supporting transmission hologram structures 44 and reflection hologram structures 42.

As shown in FIG. 7, multi-layer holographic combiner 40 may include substrate 90 (e.g., an optically transparent substrate such as a plastic substrate or other structure). Transmission hologram structures 44 may be formed on surface 91 of substrate 90 whereas reflection hologram structures 42 are formed on opposing surface 93 of substrate 90. Transmission hologram structures 44 and reflection hologram structures 42 may be formed using photopolymer films or other coatings, dielectric layers, or any other desired holographic media mounted to the surfaces of substrate 90. If desired, optional substrate 92 may be mounted to reflection hologram structures 42 and/or optional substrate 94 may be mounted to transmission hologram structures 44. Optional substrates 92 and 94 may be formed from glass, plastic, or other optically transparent materials and may serve as protective cover layers for transmission hologram structures 44 and reflection hologram structures 42. Optically clear adhesive may be used to adhere the structures of FIG. 7 together if desired.

Substrate 90 may have a relatively narrow thickness 98 (e.g., a narrower thickness relative to scenarios where a waveguide is formed between reflection hologram structures 42 and transmission hologram structures 44 and scenarios where semi-reflective combiners are used). As an example, thickness 98 may be approximately 3 mm, 2-4 mm, 1.5-4.5 mm, 1-5 mm, or other thicknesses. Eye box 24 (FIG. 2) may have a width that is, for example, approximately 11 mm, 10-12 mm, 8-14 mm, 6-16 mm, greater than 16 mm, less than 10 mm, or other widths. Transmission hologram structures 44 may diffract each incident angle of input light 56 (FIG. 2) at two or more output angles spanning angular range 96. Angular range 96 may be, for example, approximately 120 degrees, 110-130 degrees, 115-125 degrees, 100-140 degrees, or any other desired range. Substrates 92, 90, and/or 94 may be omitted if desired.

Figure 8:
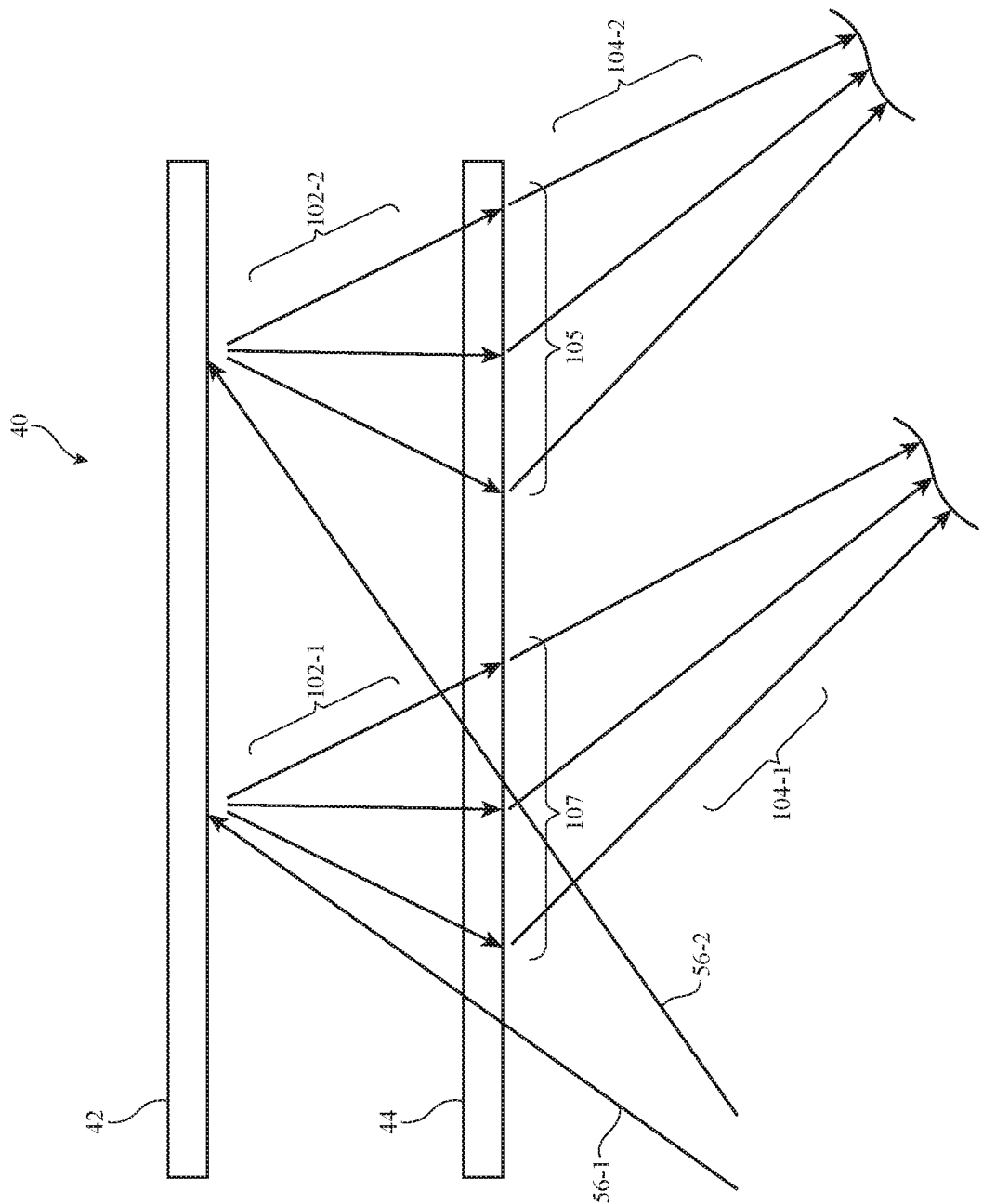
FIG. 8 is a diagram of an illustrative multi-layer holographic combiner with reflection hologram structures for replicating an external image and transmission hologram structures for focusing each replicated image onto an eye box in accordance with some embodiments.

The example of FIGS. 2-7 in which transmission hologram structures 44 replicate input light 56 and reflection hologram structures 42 focus the replicated input light onto eye box 24 is merely illustrative. In another suitable arrangement, reflection hologram structures 42 may replicate input light 56 and transmission hologram structures 44 may focus the replicated light onto eye box 24. FIG. 8 is a diagram showing how reflection hologram structures 42 may replicate input light 56 and transmission hologram structures 44 may focus the replicated light onto eye box 24.

As shown in FIG. 8, input light 56 from display module 20A of FIG. 2 may be provided to reflection hologram structures 42 from a location external to multi-layer holographic combiner 40 (e.g., without performing waveguided total internal reflection in the volume between reflection hologram structures 42 and transmission hologram structures 44). In the example of FIG. 8, the input light is shown at two incident angles (e.g., rays 56-1 and 56-2) for the sake of clarity. When configured in this way, the diffractive operations of transmission hologram structures 44 as described in FIG. 3 and reflection hologram structures 42 as described in FIG. 4 may be swapped.

For example, reflection hologram structures 42 may replicate ray 56-1 by diffracting the light at output multiple angles, as shown by rays 102-1. Similarly, reflection hologram structures 42 may replicate ray 56-2 by diffracting the light the same output angles, as shown by rays 102-2. Transmission holograms in region 107 of transmission hologram structures 44 may focus rays 102-1 towards eye box 24 (FIG. 2), as shown by rays 104-1. Similarly, transmission holograms in region 105 of transmission hologram structures 44 may focus rays 102-2 towards eye box 24. This may be repeated across the length of multi-layer holographic combiner 40 to produce the same replicated pupils 46, 48, 50, 52, and 54 as shown in FIG. 2.

In yet another suitable arrangement, multi-layer holographic combiner 40 may include two layers of reflection hologram structures (e.g., transmission hologram structures 44 may be replaced by additional reflection hologram structures). In this scenario, one of the reflection hologram structures may replicate input light 56 and the other reflection hologram structures may focus the replicated light onto eye box 24. The input light may be incident on multi-layer holographic combiner 40 from a side of multi-layer holographic combiner 40 opposite to eye box 24 in this scenario, for example.

Figure 9:
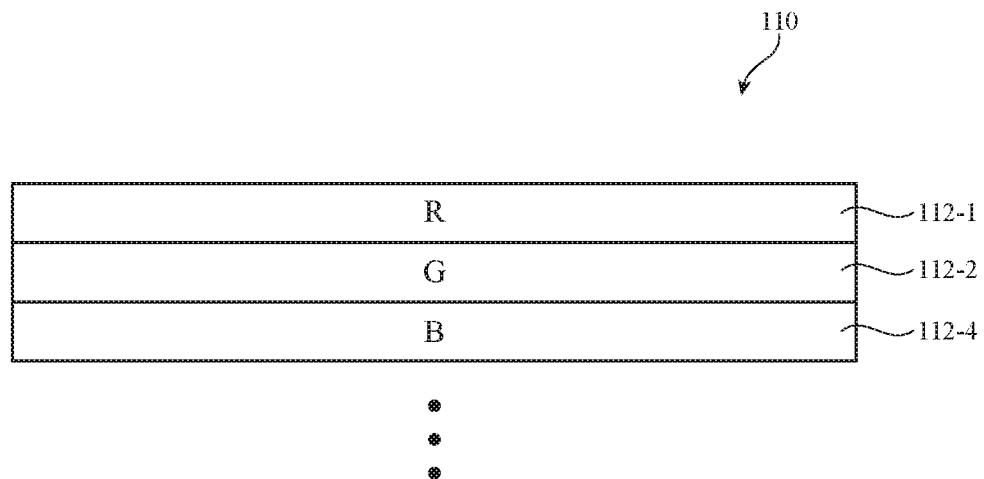
FIG. 9 is a diagram showing how separate layers of holographic films may be used for diffracting light of different wavelengths in accordance with some embodiments.
Figure 10:
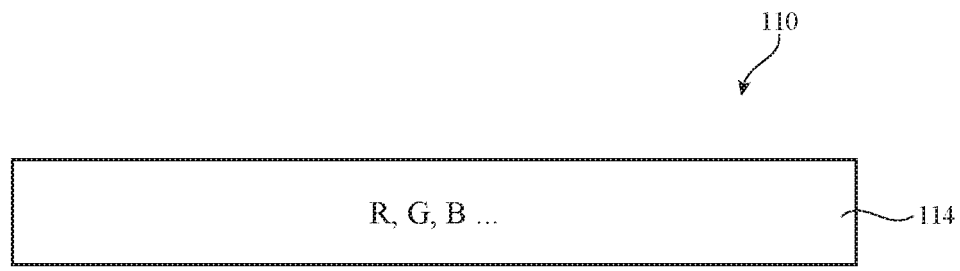
FIG. 10 is a diagram showing how holograms for diffracting light of different wavelengths may be multiplexed on the same volume of grating medium in accordance with some embodiments.

FIGS. 9 and 10 are diagrams showing how the holograms used to form multi-layer holographic combiner 40 may be color multiplexed for diffracting light of multiple wavelengths. In the example of FIG. 9, hologram structures 110 (e.g., transmission hologram structures 44 or reflection hologram structures 42 of FIGS. 2-8) may include multiple layers 112 of holograms for diffracting light of different wavelengths. Layers 112 may be holographic films of holographic recording media. A corresponding set of holograms may be recorded on each layer 112 for diffracting light as shown in FIGS. 2-8. For example, a first layer 112-1 may diffract light at a first wavelength such as red (R) light (e.g., the holograms in first layer 112-1 may be Bragg-matched to the first wavelength), a second layer 112-2 may diffract light at a second wavelength such as green (G) light, and a third layer 112-3 may diffract light at a third wavelength such as blue (B) light. This example is merely illustrative. Each layer may diffract light of any desired wavelength (e.g., ultra violet light, visible light, infrared light, etc.). Hologram structures 110 may include any desired number of layers 112 (e.g., two layers, three layers, four layers, more than four layers, etc.).

In the example of FIG. 10, hologram structures 110 (e.g., transmission hologram structures 44 or reflection hologram structures 42 of FIGS. 2-8) may include a single layer 114 of holographic recording medium. Holograms for diffracting light of different wavelengths may each be superimposed within the same volume of layer 114. For example, layer 114 may include a first set of holograms for diffracting red light (e.g., for diffracting light at different input angles at multiple output angles or for focusing replicated light on the eye box as shown in FIGS. 2-8), a second set of holograms for diffracting green light, and a third set of holograms for diffracting blue light. This example is merely illustrative. Layer 114 may include holograms for diffracting light at any desired combination of wavelengths (e.g., ultra violet light, visible light, infrared light, etc.). If desired, the arrangement of FIG. 10 may be combined with the arrangement of FIG. 9 (e.g., a single layer may include holograms for diffracting light of different wavelengths and an additional layer for diffracting light of an additional wavelength may be provided over that layer, etc.).

Figure 11:
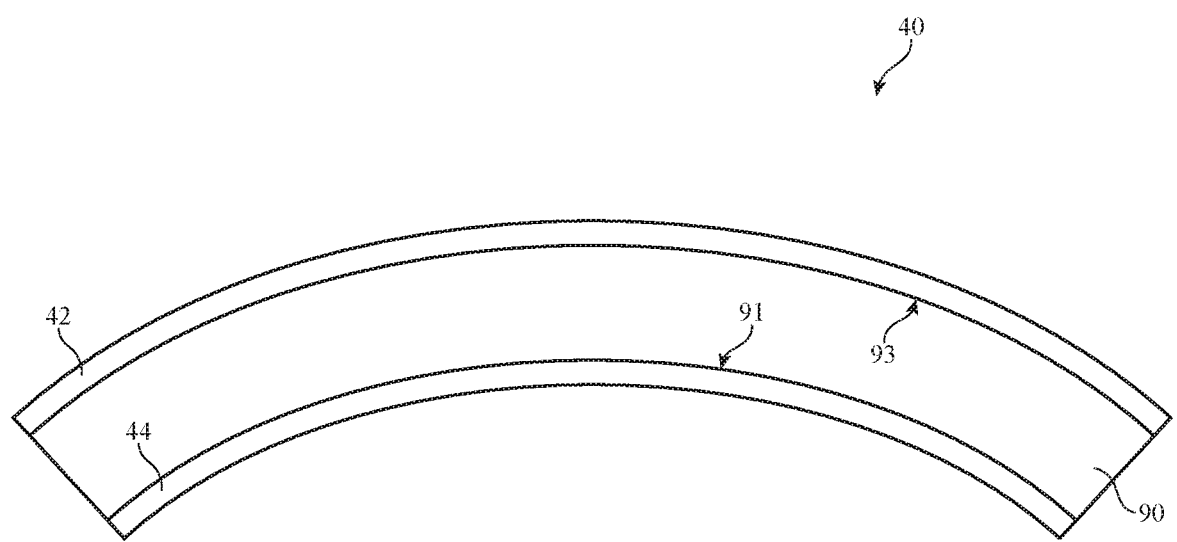
FIG. 11 is a diagram of an illustrative multi-layer holographic combiner provided with a curved shape in accordance with some embodiments.

The examples of FIGS. 2-10 in which multi-layer holographic combiner 40 is provided with a planar shape is merely illustrative. Because multi-layer holographic combiner 40 is formed without an intervening waveguide between reflection hologram structures 42 and transmission hologram structures 44, combiner 40 may be provided with any desired shape. FIG. 11 is a diagram showing how multi-layer holographic combiner 40 may be provided with a curved shape.

As shown in FIG. 11, substrate 90, reflection hologram structures 42, and transmission hologram structures 44 may each be provided with a curved shape. In one suitable arrangement, both surfaces 91 and 93 of substrate 90 are curved (e.g., reflection hologram structures 42 and transmission hologram structures 44 are provided with a similar non-zero curvature). In another suitable arrangement, one of surfaces 91 and 93 is curved whereas the other is planar. This example is merely illustrative and, in general, multi-layer holographic combiner 40 may be provided with any desired shape (e.g., to accommodate curved form factors or other form factors for housing 8 of FIG. 1).

Figure 12:
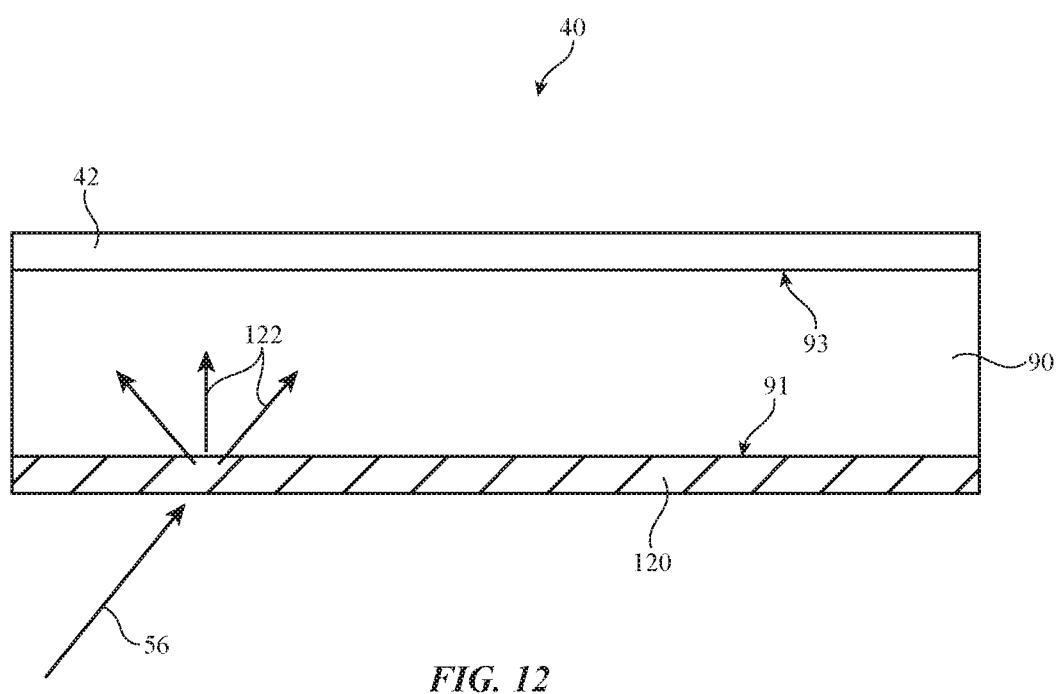
FIG. 12 is a diagram of an illustrative multi-layer holographic combiner having an optical diffuser and reflection hologram structures in accordance with some embodiments.

In another suitable arrangement, transmission hologram structures 44 may be replaced by an optical diffuser. FIG. 12 is a diagram showing how transmission hologram structures 44 may be replaced by an optical diffuser. As shown in FIG. 12, optical diffuser 120 may be formed on surface 91 of substrate 90 (or at a set distance from reflection hologram structures 42 in scenarios where substrate 90 is omitted). Optical diffuser 120 may receive input light 56 and may diffuse input light 56 over a range of different angles, as shown by arrows 122. Reflection hologram structures 42 may focus this diffused light towards eye box 24 (e.g., as shown in FIG. 4). If desired, optical diffuser 120 may include a holographic optical element. The holographic optical element may include, for example, holograms that take light from a given incident angle and that output the light continuously over every output angle. The example of FIG. 12 is merely illustrative. Substrate 90 may be curved if desired (e.g., as shown in FIG. 11).

Figure 13:
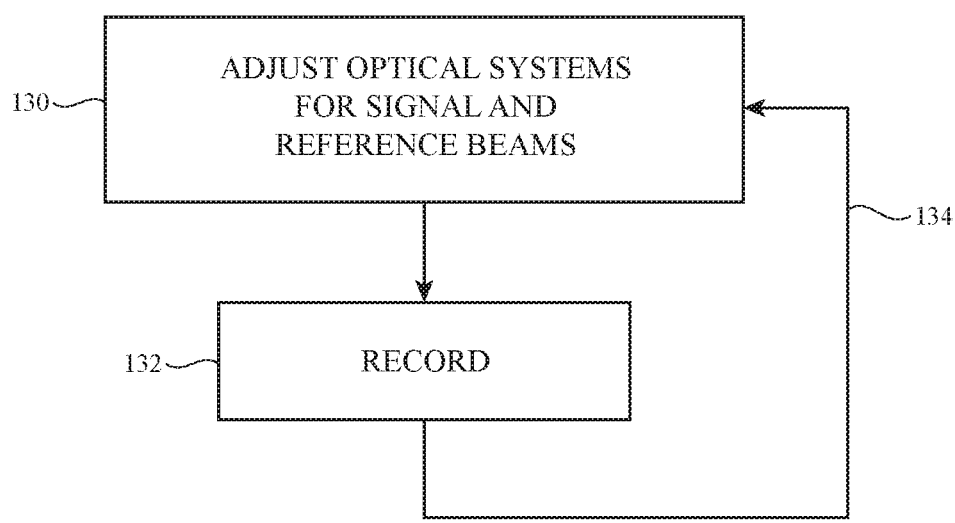
FIG. 13 is a flow chart of illustrative operations involved in recording holograms in accordance with some embodiments.

FIG. 13 is a flow chart of illustrative operations involved in using a recording system to record holograms for transmission hologram structures 44 and reflection hologram structures 42 of multi-layer holographic combiner 40. The recording system may include a controller, a fixture, a signal beam source, and a reference beam source. The recording system may include adjustable components that adjust the signal beam source and the reference beam source based on instructions from the controller. A holographic recording medium may be loaded into the fixture.

During the operations of block 130, the controller may identify settings to be used to adjust the signal and reference beams using the adjustable components of the recording system. For example, intensity, angle, wavelength, shape (e.g., beam aperture, optical power, etc.), and/or direction of the signal and reference beams can be adjusted using the controller and adjustable components.

After settings for each of these desired adjustments have been identified and system components adjusted accordingly during the operations of block 130, the controller can direct a light source (e.g., a laser or other light source) to generate light. The generated light is split into reference and signal beams and is directed into the holographic recording medium to record a hologram during the operations of block 132. After recording operations, processing may loop back to block 130 as indicated by line 134, so that one or more settings may be adjusted by the controller before optionally performing one or more additional recording operations (e.g., to form multiplexed holograms).

Figure 14:
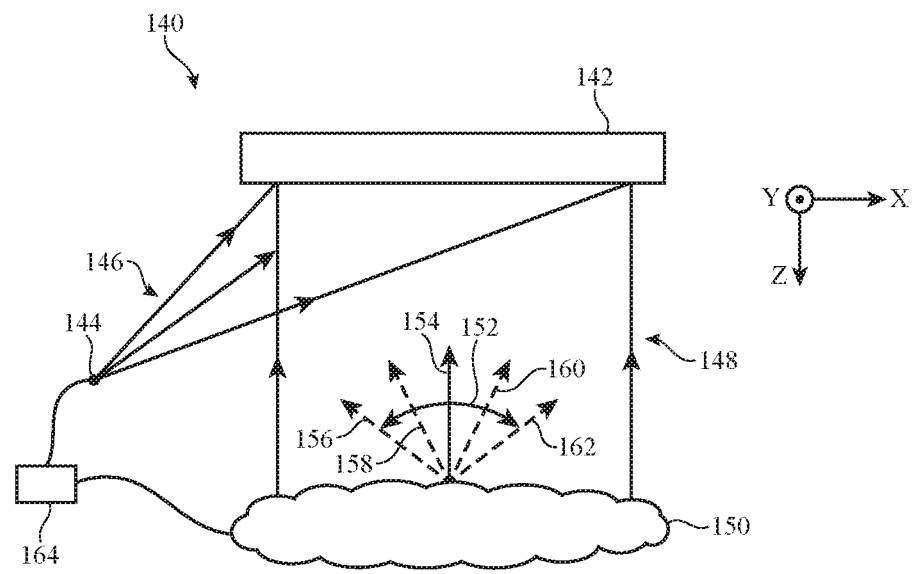
FIG. 14 is a diagram of an illustrative hologram recording system for recording transmission hologram structures in accordance with some embodiments.

FIG. 14 is a diagram of a recording system that may be used to record transmission hologram structures 44 for multi-layer holographic combiner 40. As shown in FIG. 14, recording system 140 may include a holographic recording medium 142. Recording medium 142 may be placed in a fixture (not shown for the sake of clarity). Controller 164 may control a fixed point source 144 to provide reference beam 146 to medium 142. Controller 164 may control adjustable plane source 150 to provide the corresponding signal beam 148 to the same side of recording medium 142. The interference pattern between beams 146 and 148 is recorded on medium 142 as a corresponding transmission hologram.

Controller 164 may record multiple holograms on medium 142 (e.g., holograms for replicating input light 56 of FIG. 2) by adjusting the angle of signal beam 148 before each exposure of medium 142 (e.g., during each iteration of FIG. 13), as shown by arrow 152. For example, controller 164 may control plane source 150 to provide signal beam 148 in direction 154 for recording transmission holograms in medium 142 that diffract input light at output angle B3 of FIG. 3, in direction 158 for recording transmission holograms in medium 142 that diffract input light at output angle B2 of FIG. 3, in direction 156 for recording transmission holograms in medium 142 that diffract input light at output angle B1 of FIG. 3, in direction 160 for recording transmission holograms in medium 142 that diffract input light at output angle B4 of FIG. 3, in direction 162 for recording transmission holograms in medium 142 that diffract input light at output angle B5 of FIG. 3, etc. The orientation of reference beam 146 may be adjusted to adjust the incident angle operated on by each transmission hologram recorded in medium 142. Controller 164 may adjust the wavelength of reference beam 146 and signal beam 148 to record holograms for diffracting other wavelengths of light (e.g., using separate medium layers 112 as shown in FIG. 9 or a single medium layer as shown in FIG. 10).

Figure 15:
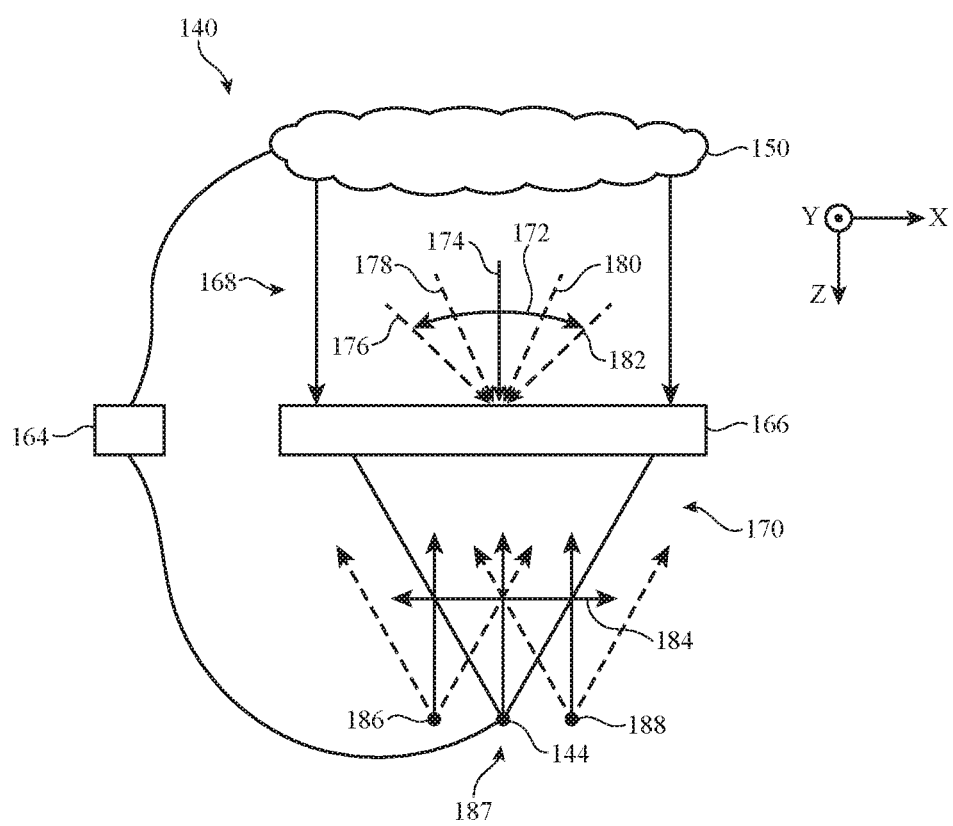
FIG. 15 is a diagram of an illustrative hologram recording system for recording reflection hologram structures in accordance with some embodiments.

FIG. 15 is a diagram of a recording system that may be used to record reflection hologram structures 42 for multi-layer holographic combiner 40. As shown in FIG. 15, recording system 140 may include a holographic recording medium 166. Recording medium 166 may be placed in a fixture (not shown for the sake of clarity). Controller 164 may control adjustable point source 144 to provide signal beam 170 to medium 166. Controller 164 may control adjustable plane source 150 to provide the corresponding reference beam 168 to the opposite side of recording medium 142. The interference pattern between beams 168 and 170 is recorded on medium 166 as a corresponding reflection hologram.

Controller 164 may record multiple holograms on medium 166 while adjustable point source 144 remains fixed at a given location by adjusting the angle of reference beam 168 before each exposure of medium 166 for a given fixed location of adjustable point source 144. Once each angle of adjustable plane source 150 has been used to record a corresponding hologram, adjustable point source 144 may be translated parallel to the X-axis, as shown by arrow 184 (e.g., to locations 186, 187, 188, etc.). This process may then be repeated to record different sets of holograms in each region across the length of medium 166.

As an example, adjustable point source 144 may be moved to location 186 for recording reflection holograms within region 62 of reflection hologram structures 42 (FIG. 4). Once adjustable point source 144 is in place at location 186, controller 164 may control plane source 150 to provide reference beam 168 in direction 174 for recording reflection holograms in medium 166 that diffract ray 60-3 at output angle C1 of FIG. 4, in direction 178 for recording reflection holograms in medium 166 that diffract ray 60-4 at output angle C1 of FIG. 4, etc. Once a reflection hologram has been recorded for each replicated beam generated by transmission hologram structures 44 (e.g., once adjustable plane source 150 has been rotated as shown by arrow 172 to record at directions 176, 178, 174, 180, and 182), adjustable point source 144 may be moved to location 187 for recording reflection holograms within region 64 of reflection hologram structures 42 (FIG. 4).

Once adjustable point source 144 is in place at location 187, controller 164 may control plane source 150 to provide reference beam 168 in direction 174 for recording reflection holograms in medium 166 that diffract ray 60-8 at output angle C2 of FIG. 4, in a different direction (e.g., a direction between arrows 178 and 174) for recording reflection holograms in medium 166 that diffract ray 60-9 at output angle C2 of FIG. 4, etc. Once a reflection hologram has been recorded for each replicated beam generated by transmission hologram structures 44, adjustable point source 144 may be moved to location 188. This process may be repeated across the length of medium 166 for recording reflection holograms that focus the image replicated by transmission hologram structures 44 towards the eye box. Controller 164 may adjust the wavelength of reference beam 168 and signal beam 170 to record holograms for diffracting other wavelengths of light (e.g., using separate medium layers 112 as shown in FIG. 9 or a single medium layer as shown in FIG. 10).

The examples of FIGS. 14 and 15 are merely illustrative. In the example of FIGS. 14 and 15, point-to-plane-wave transmission holograms are recorded on medium 142 and plane-wave-to-point reflection holograms are recorded on medium 166. This is merely illustrative. In general, any desired wave fronts may be used for recording the holograms of multi-layer holographic combiner 40.

Figure 16:
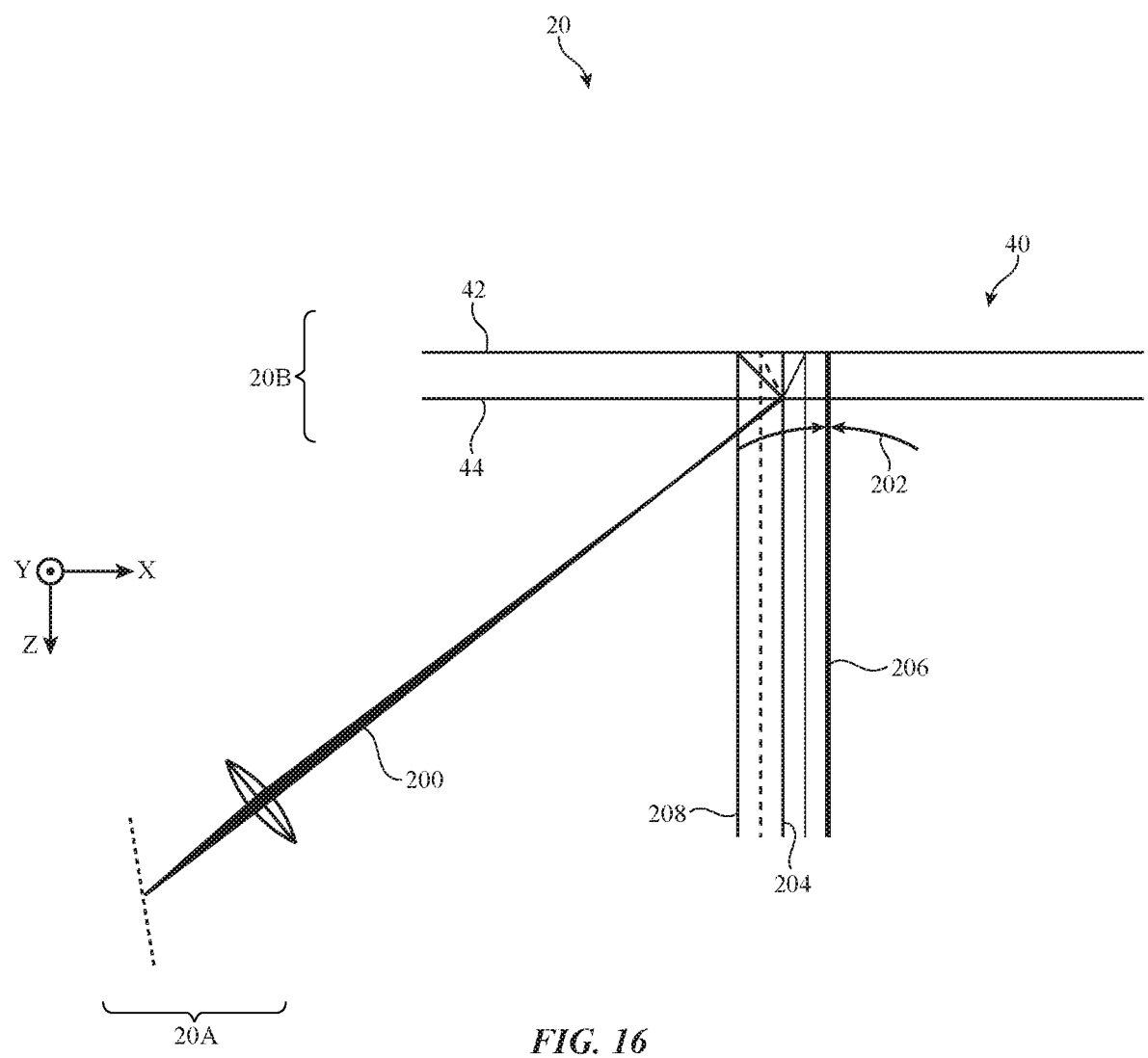
FIG. 16 is a diagram of an illustrative display system having a multi-layer holographic combiner provided with optical power that varies as a function of eye box position to compensate for aberrations produced by the optical components of the display system in accordance with some embodiments.

If desired, the transmission holograms in transmission hologram structures 44 and/or the reflection holograms in reflection hologram structures 42 may be recorded with an optical power that configure the holograms to compensate for aberrations in the optical components of display 20. FIG. 16 is a diagram showing how reflection holograms in reflection hologram structures 42 may be configured to compensate for aberrations in the optical components of display 20.

As shown in FIG. 16, display module 20A may provide input light 200 to multi-layer holographic combiner 40 that are subject to aberrations or other geometric non-idealities (e.g., due to the geometric properties of the components of display module 20A). These aberrations may cause wider separation eye boxes to no longer be collimated, instead being focused beyond infinity by a considerable amount. In practice, increasing the separation between transmission hologram structures 44 and reflection hologram structures 42 may help to reduce this field curvature, but may undesirably increase the size of display 20.

In order to mitigate these issues, reflection holograms in reflection hologram structures 42 may be recorded to provide more optical power to some of the diffracted beams than others for a given input beam to transmission hologram structures 44. For example, the reflection holograms in reflection hologram structures 42 may be configured to provide optical power to beams with the largest diffraction angle from transmission hologram structures 44, such as beams 206 and 208 (e.g., the largest displaced eye boxes). At the same time, less or no optical power may be provided to the eye box at center line 204. In this way, beams 208 and 206 may be provided with optical power, as shown by width 202, that compensates for aberrations generated by display module 20A.

Figure 17:
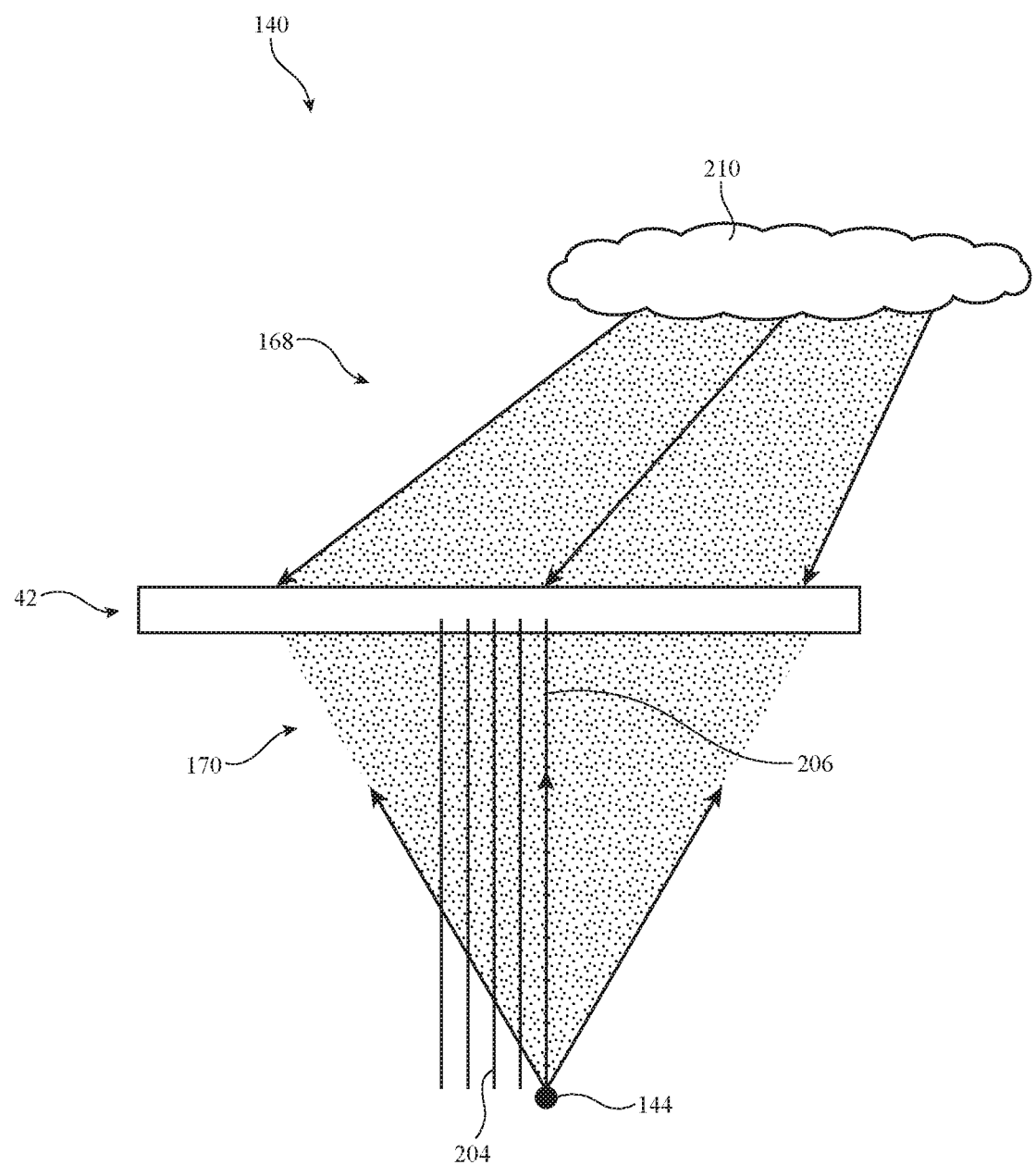
FIG. 17 is a diagram of an illustrative hologram recording system for recording reflection holograms that are provided with varying optical power to compensate for aberrations produced by the optical components of a display system in accordance with some embodiments.

FIG. 17 is a diagram of recording system 140 for generating reflection hologram structures 42 of the type shown in FIG. 16. As shown in FIG. 17, a suitable amount of optical power is added to the plane wave of reference beam 168 to compensate for these field curvature effects at eye boxes displaced from center line 204. The eye box at center line 204 may, for example, be recorded using a reference beam plane wave without this additional optical power. Recording for the edge of the eye box is shown in the example of FIG. 17 (exaggerated) with power added to ensure that beam 206 is focused onto the micro display correctly.

The example of FIGS. 16 and 17 are merely illustrative. In another suitable arrangement, transmission hologram structures 44 may be configured to compensate for aberrations from display module 20A in a similar manner. If desired, both transmission hologram structures 44 and reflection hologram structures 42 in multi-layer holographic combiner 40 may be provided with optical power to compensate for these aberrations. If desired, the hologram mastering for multi-layer holographic combiner 40 may configure the holograms to pre-compensate for holographic film material shrinkage.

The example of FIGS. 2-17 in which multi-layer holographic combiner 40 redirects light from display module 20A only towards eye box 24 is merely illustrative. If desired, multi-layer holographic combiner 40 may include additional holograms that redirect some of the light from display module 20A towards an image sensor. The image sensor may capture image data in response to the redirected light from the display module. Control circuitry may perform feedback adjustments to the display module based on the image data.

Figure 18:
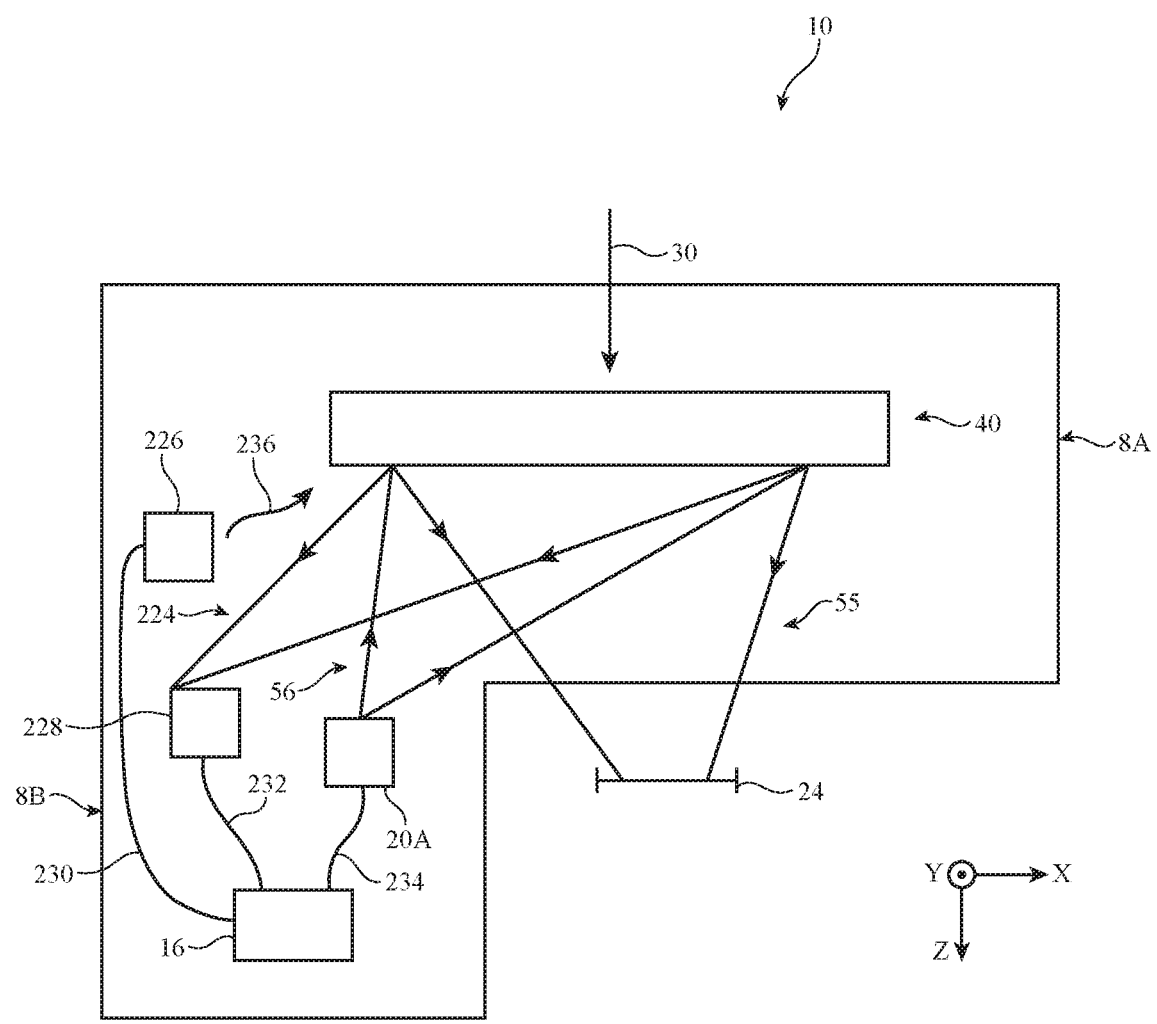
FIG. 18 is a diagram of an illustrative system having an image sensor for performing feedback adjustments on a projector that illuminates a multi-layer holographic combiner to mitigate changes in relative position between the projector and the multi-layer holographic combiner over time in accordance with some embodiments.

FIG. 18 is a diagram showing how multi-layer holographic combiner 40 may redirect some of the light from display module 20A towards an image sensor. As shown in FIG. 18, system 10 may include multi-layer holographic combiner 40 in housing portion 8A (e.g., a first portion of housing 8 of FIG. 1) whereas display module 20A is located in a separate housing portion 8B (e.g., a second portion of housing 8 of FIG. 1). In practice, the position of housing portion 8A may change relative to the position of housing portion 8B over time. For example, housing portion 8B may bend (e.g., around an axis parallel to the Y-axis of FIG. 18) relative to housing portion 8A (e.g., in scenarios where housing 8 of FIG. 1 is formed from a flexible material). In another example, housing portion 8A may be coupled to housing portion 8B by a hinge and housing portions 8A and 8B may rotate about the hinge such that the relative angle between housing portion 8A and housing portion 8B may be non-uniform over time. In scenarios where system 10 is implemented as a head mounted device (e.g., a pair of glasses or goggles), housing portion 8B may form a temple of a frame for the head mounted device whereas housing portion 8A forms a bridge or other portion of the frame for the head mounted device. In this example, the arrangement of FIG. 18 illustrates only one side of the head mounted device (e.g., housing portion 8B may form a left or right temple of the head mounted device). Similar structures may be used to project light to the user's other eye.

When the position of housing portion 8B changes relative to the position of housing portion 8A, display module 20A moves relative to multi-layer holographic combiner 40. If care is not taken, this may serve to distort the user's perspective when viewing images displayed by display module (projector) 20A at eye box 24. In order to mitigate these issues, multi-layer holographic combiner 40 may redirect a portion of the input light 56 from display module 20A towards image sensor 228, as shown by beam 224. For example, transmission hologram structures 44 and/or reflection hologram structures 42 in multi-layer holographic combiner 40 may each include at least one hologram that diffracts input light 56 towards image sensor 228. Image sensor 228 may include a camera or other image sensor components that gather image data in response to beam 224. When the position of housing portion 8A and multi-hologram holographic combiner 40 change relative to the position of housing portion 8B and display module 20A, distortions in the beam 55 redirected towards eye box 24 by combiner 40 will also be present in beam 224 provided towards image sensor 228. The image data gathered by image sensor 228 may serve to identify these perspective distortions.

Control circuitry 16 may be mounted in housing portion 8B or elsewhere in system 10. Control circuitry 16 may be coupled to image sensor 228 over control path 232 and may be coupled to display module 20A over control path 234. Image sensor 228 may provide the captured image data to control circuitry 16 over control path 232. Control circuitry 16 may identify distortions in beam 55 (as exhibited by beam 224) and thus any relative motion between housing portion 8A and housing portion 8B using the image data. Control circuitry 16 may provide control signals to display module 20A over control path 234 to control display module 20A to compensate for these distortions. For example, control circuitry 16 may adjust the position and/or geometry of optical components within display module 20A, may adjust the brightness/intensity of input light 56, may adjust the color of input light 56, and/or may perform any other desired adjustments to display module 20A that compensate for distortions in beam 55 on account of the change in relative position between combiner 40 and display module 20A.

In one suitable arrangement, a portion of the same input light 56 that is redirected towards eye box 24 is provided to image sensor 228 over beam 224. In another suitable arrangement, display module 20A may emit light at a dedicated wavelength such as infrared light as a part of input light 56. One or more holograms in combiner 40 may redirect light at the dedicated wavelength towards image sensor 228 (e.g., without light at that wavelength being redirected towards eye box 24). Image sensor 228 may be an infrared image sensor in this scenario.

If desired, an infrared projector 226 may be provided in system 10 (e.g., within housing portion 8A, housing portion 8B, or elsewhere). Infrared projector 226 may be coupled to control circuitry 16 over control path 230. Control circuitry 16 may control infrared projector 226 to project infrared light 236 for directing towards eye box 24. Infrared light 236 may be provided directly to eye box 24, may be redirected towards eye box 24 by other optical components (not shown), and/or may be directed towards eye box 24 by one or more holograms in combiner 40 (e.g., reflection holograms in reflection hologram structures 42 and/or transmission holograms in transmission hologram structures 44). Infrared light 236 may reflect off of the user's eye within eye box 24 (e.g., off of the user's retina or other physiological features). The reflected infrared light may be directed towards an infrared image sensor (e.g., image sensor 228 or a separate image sensor located within housing portion 8A, housing portion 8B, or elsewhere). The reflected infrared light may be provided to the infrared image sensor directly, by dedicated optical components (not shown), and/or by one or more holograms in combiner 40 (e.g., reflection holograms in reflection hologram structures 42 and/or transmission holograms in transmission hologram structures 44).

The infrared image sensor may generate gaze (eye) tracking data in response to the reflected infrared light that is indicative of the direction in which the user is gazing into eye box 24. Control circuitry 16 may process the gaze tracking data to track the direction of the user's gaze over time. Control circuitry 16 may adjust the image data projected by display module 20A, adjust the physical properties of input light 56, and/or may perform any other desired operations based on how the user's gaze changes over time. In another suitable arrangement, infrared light emitted by display module 20A may be used to perform gaze tracking operations. This example is merely illustrative and, if desired, infrared projector 226 and gaze tracking functionality may be omitted.

Figure 19:
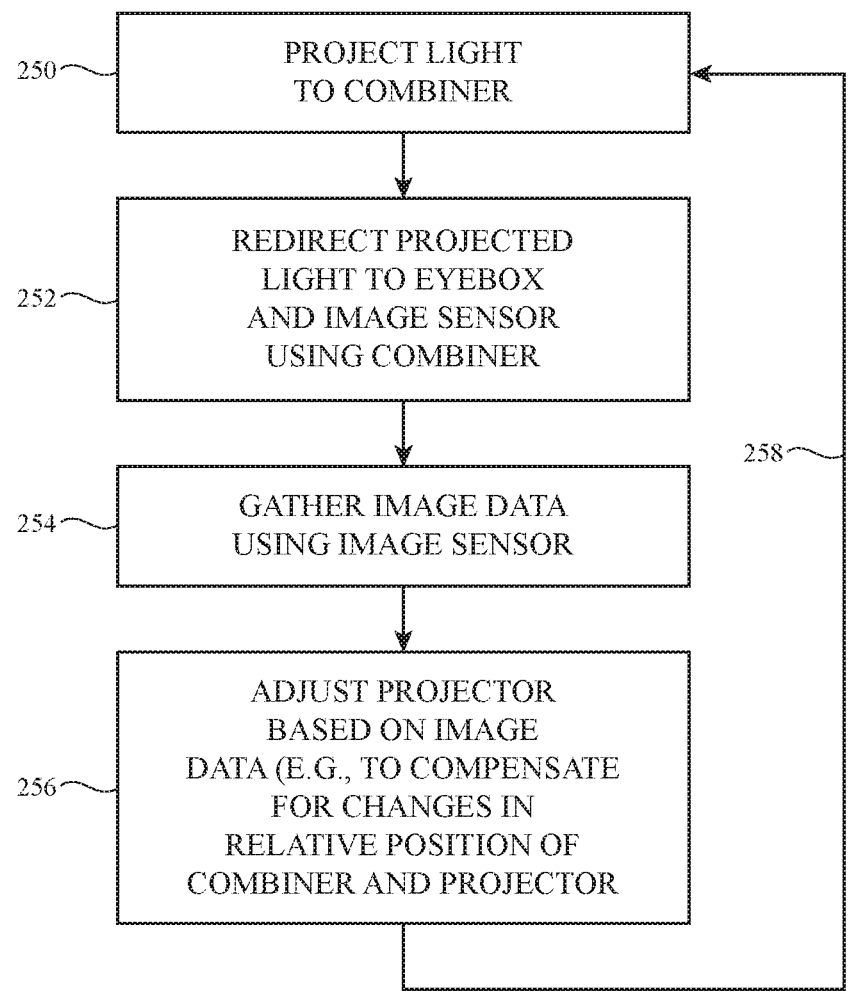
FIG. 19 is a flow chart of illustrative steps involved in performing feedback adjustments on a projector that illuminates a multi-layer holographic combiner to mitigate changes in relative position between the projector and the multi-layer holographic combiner over time in accordance with some embodiments.

FIG. 19 is a flow chart of illustrative steps that may be processed by system 10 in performing feedback operations on display module 20A to compensate for changes in the position of display module 20A relative to multi-layer holographic combiner 40 over time (e.g., to minimize distortions in light 55 provided to eye box 24).

At step 250, display module 20A may project light 56 onto multi-layer holographic combiner 40.

At step 252, multi-layer holographic combiner 40 may replicate light 56 and focus the replicated light onto eye box 24. At the same time, multi-layer holographic combiner 40 may redirect a portion of light 56 onto image sensor 228 (e.g., as shown by beam 224 of FIG. 18).

At step 254, image sensor 228 may gather image data in response to beam 224 from multi-layer holographic combiner 40. Image sensor 228 may convey the image data to control circuitry 16 over control path 230 (FIG. 18).

At step 256, control circuitry 16 may process the image data to determine whether display module 20A needs to be adjusted to compensate for changes in the relative position between combiner 40 and display module 20A (e.g., due to bending or rotation of housing portions 8A and 8B). For example, control circuitry 16 may determine whether distortions associated with changes in relative position are present in the image data. If compensation is needed, control circuitry 16 may control display module 20A to compensate for these changes. For example, control circuitry 16 may adjust the position and/or geometry of optical components within display module 20A, may adjust the brightness/intensity of input light 56, may adjust the color of input light 56, and/or may perform any other desired adjustments to display module 20A that compensate for distortions in beam 55 on account of the change in relative position between combiner 40 and display module 20A. If no compensation is needed, adjustments to display module 20A may be omitted. Processing may subsequently loop back to step 250 as shown by arrow 258.

In this way, system 10 may perform active feedback on the projected images to compensate for changes in the position of housing portion 8A relative to the position of housing portion 8B over time (e.g., using image data indicative of the user's perspective at eye box 24). This may help to ensure that images having a uniform and non-distorted perspective are provided to eye box 24 over time.

Display module 20A as described herein may include any desired displays or light projection components. As examples, display module 20A may include spatial light modulators, liquid crystal displays, organic light-emitting diode displays, laser-based displays, microelectromechanical system (MEMS)-based displays, digital micromirror device (DMD) displays, liquid crystal on silicon (LCoS) displays, computer-generated holography (CGH) displays, or displays of other types. If desired, optical components may be provided for directing light from display module 20A onto multi-layer holographic combiner 40.

If desired, display module 20A may be configured to project light using foveation techniques. In these scenarios, the display module may display images in which a central portion of the displayed image is provided at higher resolution than peripheral portions of the displayed image. This may, for example, mimic the natural response of the user's eye such that the displayed images still appear naturally to the user while also reducing the resources and data rate required to display the images.

Figure 20:
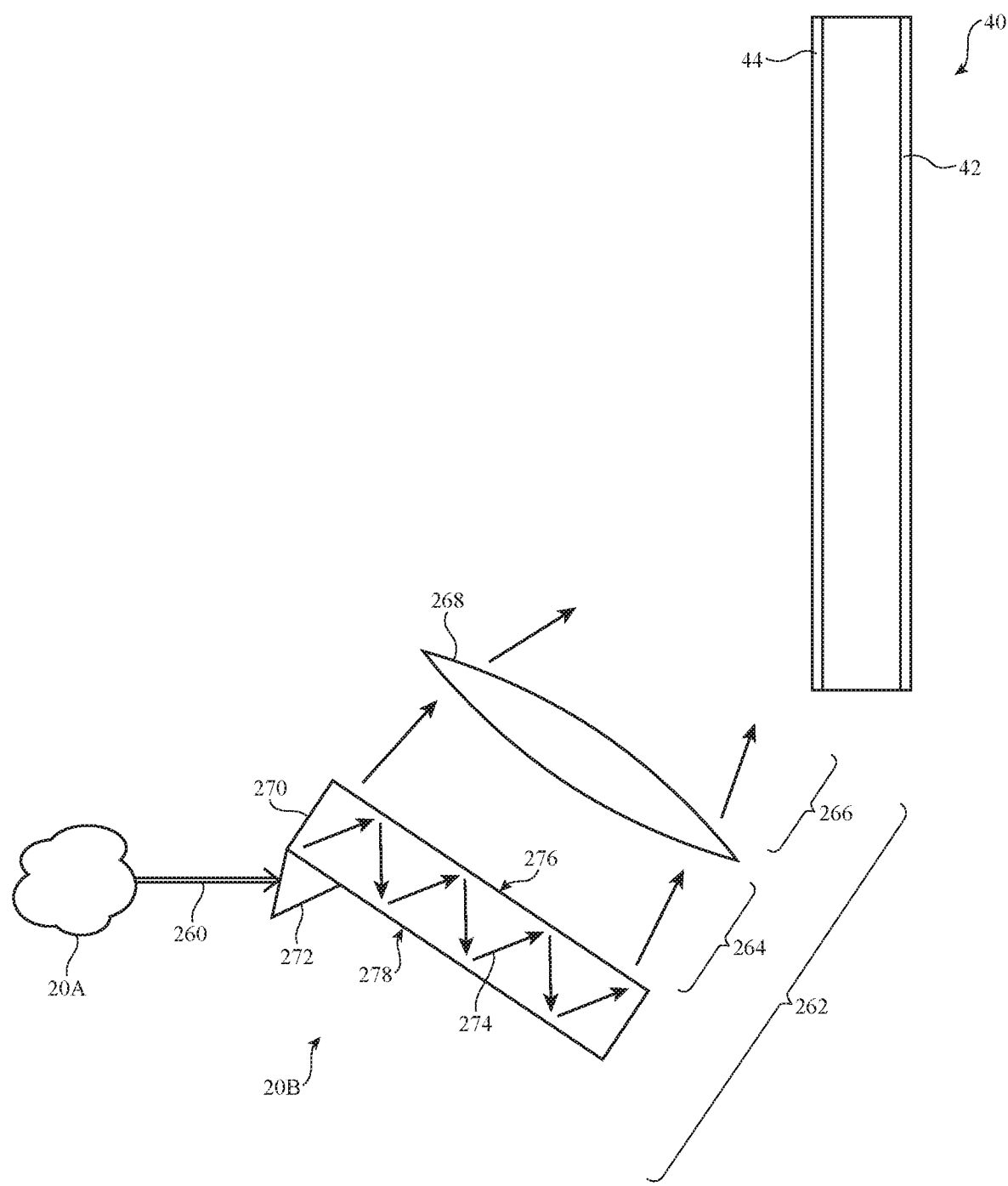
FIG. 20 is a diagram of an illustrative optical system having a waveguide for expanding the pupil for a multi-layer holographic combiner in accordance with some embodiments.

FIG. 20 is a diagram showing how a waveguide may be used to direct and expand light (entrance pupils) from display module 20A onto multi-layer holographic combiner 40. As shown in FIG. 20, display module 20A may generate a relatively narrow beam of image light 260. Optical system 20B may include optical components 262 for redirecting and expanding beam 260 onto multi-layer holographic combiner 40.

Optical components 262 may include a waveguide such as waveguide 270. Waveguide 270 may be provided with an input coupler such as input coupling prism 272 mounted to surface 278 of waveguide 270. This is merely illustrative and, in general, any desired input couplers may be used. Prism 272 may couple beam 260 into waveguide 270. The light from beam 260 may propagate down the length of waveguide 270 between surfaces 276 and 278 under the principle of total internal reflection (as show by arrows 274). Some of the light may be coupled out of waveguide 270 at multiple points as the light propagates down the length of waveguide 270 (e.g., at each point where the light hits surface 276, using output couplers on surface 276, output couplers on surface 278, and/or output couplers embedded within waveguide 270, etc.). This may serve to expand the relatively narrow beam 260 into expanded beam 264. Optical components 262 may include optical elements 268 (e.g., one or more lenses) that provide expanded beam 264 with a desired optical power and that focus expanded beam 264 onto multi-layer holographic combiner 40, as shown by beam 266. Multi-layer holographic combiner 40 may replicate beam 266 and may focus the replicated beams onto the eye box (e.g., beam 266 may form input light 56 of FIGS. 2-4, 8, 12, and 18). When configured in this way, the pupils provided to eye box 24 (e.g., based on beam 266) may be expanded relative to scenarios where optical components 262 are omitted. The example of FIG. 20 is merely illustrative and, in general, optical components 262 may include any desired optical elements.

Figure 21:
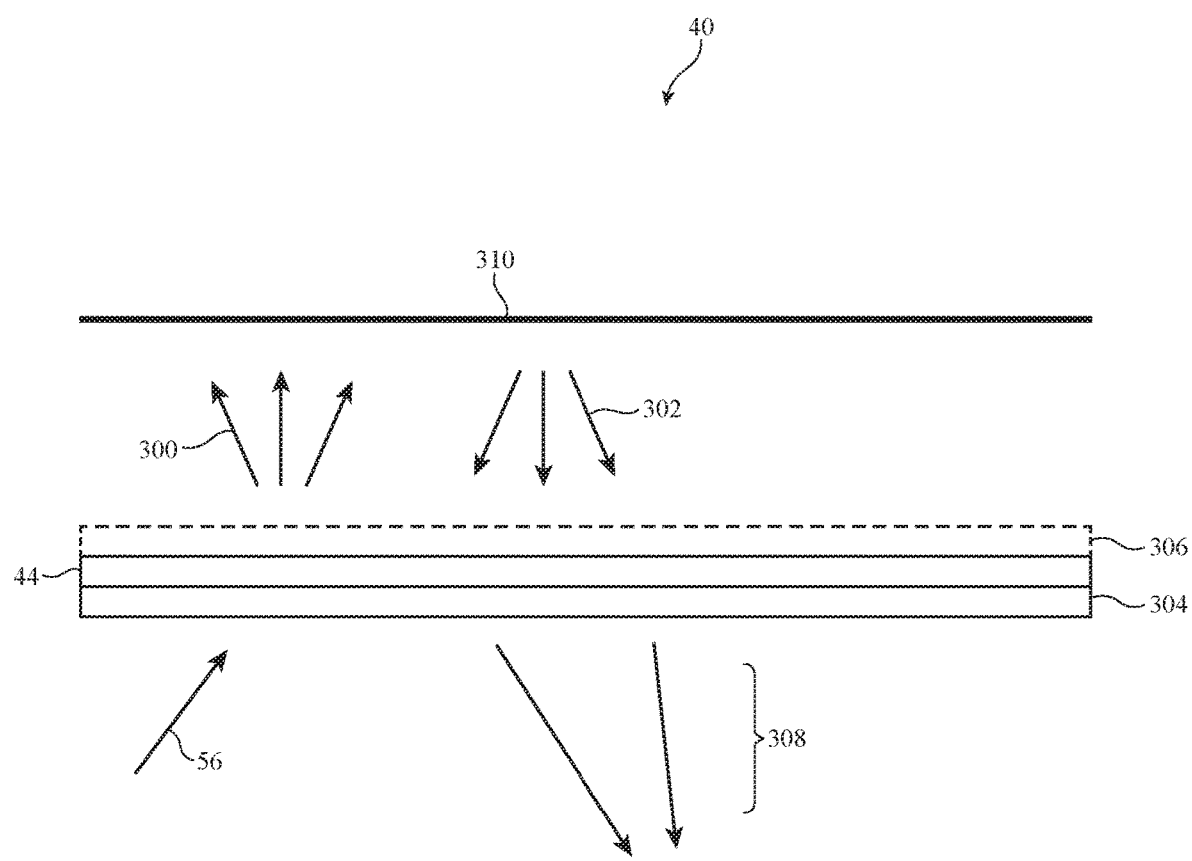
FIG. 21 is a diagram of an illustrative multi-layer optical combiner having multiple transmission hologram structures in accordance with some embodiments.

In another suitable arrangement, if desired, multi-layer holographic combiner 40 may include multiple transmission hologram structures. FIG. 21 is a diagram showing how multi-layer holographic combiner 40 may include multiple transmission hologram structures. As shown in FIG. 21, multi-layer holographic combiner 40 may include transmission hologram structures 44 and additional transmission hologram structures 304. In the example of FIG. 21, additional transmission hologram structures 304 are layered under transmission hologram structures 44. If desired, additional transmission hologram structures 304 may be layered on the opposing side of transmission hologram structures 44 (e.g., over transmission hologram structures 44), as shown by dashed box 306. In yet another suitable arrangement, additional transmission hologram structures 304 may be formed from the same holographic structures as transmission hologram structures 44 (e.g., structures 304 and 44 may be formed from superimposed holograms recorded within the same volume of holographic medium).

Transmission hologram structures 44 may replicate input light 56, as shown by replicated light 300. Multi-layer holographic combiner 40 may include a partially reflective structure 310 that reflects replicated light 300 towards additional transmission hologram structures 304, as shown by reflected replicated light 302. Additional transmission hologram structures 304 may focus reflected replicated light 302 onto eye box 24 (FIG. 2). This may serve to advantageously double the path length for image replication by multi-layer holographic combiner 40. Partially reflective structure 310 may include a half-silvered mirror, reflective coatings, a reflective holographic optical element, a filter such as a notch filter (e.g., a thin film interference filter that reflects light over a relatively narrow band of wavelengths), or other reflective structures.

The example of FIGS. 2-21 in which multi-layer holographic combiner 40 is described as being used to combine virtual and real-world images is merely illustrative. In general, multi-layer holographic combiner 40 may redirect image light towards eye box 24 without also conveying real world light 30 (FIG. 2). In other words, multi-layer holographic combiner 40 need not be an optical combiner and may, in general, be any desired optical system for redirecting input light 56 using at least one layer of hologram structures (e.g., reflection hologram structures 42 and transmission hologram structures 44) as described herein. Multi-layer holographic combiner 40 may therefore also sometimes be referred to herein as multi-layer optical system 40 or optical system 40.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact, For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR. environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

As described above, one aspect of the present technology is the gathering and use of data available from various sources to improve the delivery of images to users, perform gaze tracking operations, and/or to perform other display-related operations. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to track a user's gaze to update displayed images and/or to perform other desired display operations. Accordingly, use of such personal information data enables users to view updated display images. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gaze tracking, the present technology can be configured to allow users to select to "opt in" or "opt out" of participation in the collection of personal information data during registration for services or anytime thereafter. In another example, users can select not to perform gaze tracking or other operations that gather personal information data. In yet another example, users can select to limit the length of time gaze tracking is performed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, display images based on non-personal information data or a bare minimum amount of personal information, such as the content being requested by the device associated with a user, other non-personal information available to the display system, or publicly available information.

The foregoing is merely illustrative and various modifications can be made to the described embodiments. The foregoing embodiments may be implemented individually or in any combination.

What is claimed is:

1. An electronic device comprising:
a projector configured to generate light;
first holograms; and
second holograms, wherein the first holograms are configured to receive the light, the first holograms are configured to replicate the light by diffracting the light, and the second holograms are configured to focus, onto a focal point, the light diffracted by the first holograms, the light being Bragg-matched to the first holograms at input angles from the projector and output angles towards the second holograms.

2. The electronic device of claim 1, wherein the first holograms comprise transmission holograms.

3. The electronic device of claim 2, wherein the second holograms comprise reflection holograms.

4. The electronic device of claim 3, wherein the transmission holograms comprise point-to-plane-wave transmission holograms and wherein the reflection holograms comprise plane-wave-to-point reflection holograms.

5. The electronic device of claim 3, wherein the transmission holograms comprise plane-wave-to-plane-wave transmission holograms and wherein the reflection holograms comprise plane-wave-to-point reflection holograms.

6. The electronic device of claim 3, wherein the transmission holograms comprise point-to-nearly-plane-wave transmission holograms and wherein the reflection holograms comprise nearly-plane-wave-to-point reflection holograms.

7. The electronic device of claim 3, wherein the transmission holograms comprise a first transmission hologram configured to diffract the light from a first incident angle at a first output angle towards the reflection holograms, and wherein the transmission holograms comprise a second transmission hologram configured to diffract the light from the first incident angle at a second output angle towards the reflection holograms.

8. The electronic device of claim 7, wherein the first transmission hologram is configured to diffract the light from a second incident angle at the first output angle towards the reflection holograms, wherein the second transmission hologram is configured to diffract the light from the second incident angle at the second output angle towards the reflection holograms, wherein the reflection holograms comprise a first region having a first reflection hologram configured to diffract the light that was diffracted by the first transmission hologram at a third output angle towards the focal point and a second reflection hologram configured to diffract the light that was diffracted by the second transmission hologram at the third output angle towards the focal point, and wherein the reflection holograms comprise a second region having a third reflection hologram configured to diffract the light that was diffracted by the first transmission hologram at a fourth output angle towards the focal point and a fourth reflection hologram configured to diffract the light that was diffracted by the second transmission hologram at the fourth output angle towards the focal point.

9. The electronic device of claim 1, further comprising:
a substrate having opposing first and second surfaces, wherein the first holograms are mounted to the first surface and the second holograms are mounted to the second surface;
a first dielectric cover layer over the first holograms; and
a second dielectric cover layer over the second holograms.

10. The electronic device of claim 1, wherein the first and second holograms each have a non-zero physical curvature and wherein the first holograms are located within 8 mm of the second holograms.

11. The electronic device of claim 1, wherein the second holograms are provided with an optical power that configures the second holograms to mitigate aberrations associated with the projector.

12. The electronic device of claim 11, wherein the first holograms are provided with an additional optical power that configures the first holograms to mitigate the aberrations associated with the projector.

13. The electronic device of claim 11, wherein the second holograms are configured to provide more optical power to the replicated light at a larger diffraction angle from the first holograms than to the replicated light at a smaller diffraction angle from the first holograms.

14. The electronic device of claim 1, wherein the first holograms comprise a first film having a first set of holograms configured to diffract light of a first wavelength and a second film having a second set of holograms configured to diffract light of a second wavelength.

15. The electronic device of claim 1, wherein the first holograms comprise a medium having a first set of holograms configured to diffract light of a first wavelength and a second set of holograms that is superimposed with the first set of holograms in the medium and that is configured to diffract light of a second wavelength.

16. The electronic device of claim 1, wherein the optical system comprises an optical combiner configured to combine the light with real world light.

17. The electronic device of claim 1, wherein the first holograms comprise transmission holograms and the second holograms comprise reflection holograms, further comprising:
a substrate having opposing first and second surfaces, wherein the first holograms are mounted to the first surface and the second holograms are mounted to the second surface;
a first dielectric cover layer over the first holograms; and
a second dielectric cover layer over the second holograms, wherein the second holograms are configured to provide more optical power to the replicated light at a larger diffraction angle from the first holograms than to the replicated light at a smaller diffraction angle from the first holograms, wherein the first holograms comprise a first film having a first set of holograms configured to diffract light of a first wavelength and a second film having a second set of holograms configured to diffract light of a second wavelength.

18. The electronic device of claim 1, wherein the first holograms comprise transmission holograms, the second holograms comprise reflection holograms, further comprising:
a substrate having opposing first and second surfaces, wherein the first holograms are mounted to the first surface and the second holograms are mounted to the second surface;
a first dielectric cover layer over the first holograms; and
a second dielectric cover layer over the second holograms, wherein the second holograms are configured to provide more optical power to the replicated light at a larger diffraction angle from the first holograms than to the replicated light at a smaller diffraction angle from the first holograms, wherein the first holograms comprise a medium having a first set of holograms configured to diffract light of a first wavelength and a second set of holograms that is superimposed with the first set of holograms in the medium and that is configured to diffract light of a second wavelength.

19. A display comprising:
a projector configured to output light;
a first layer of holograms configured to replicate the light over a plurality of output angles by diffracting the light; and
a second layer of holograms configured to focus, onto a focal point, the light diffracted by the first layer of holograms, the light being Bragg-matched to the first layer of holograms at input angles from the projector and at the plurality of output angles, the plurality of output angles being oriented towards the second layer of holograms.

20. The display of claim 19, wherein the projector comprises a display selected from the group consisting of: a liquid crystal display, an organic light-emitting diode display, a laser-based display, a microelectromechanical system (MEMS) display, a digital micromirror device (DMD) display, a liquid crystal on silicon (LCoS) display, and a computer-generated holography (CGH) display.

21. The display of claim 19, further comprising:
a waveguide, wherein the waveguide is configured to receive the light from the projector, expand the light, and provide the expanded light to the first layer of holograms; and
a lens configured to focus the expanded light onto the first layer of holograms.

22. The display of claim 19, wherein the first layer of holograms comprises transmission holograms and the second layer of holograms comprises reflection holograms.

23. An electronic device comprising:
a projector configured to produce light;
an optical sensor;
a substrate;
first diffractive gratings on the substrate and configured to redirect a first portion of the light to a point; and
second diffractive gratings on the substrate and configured to redirect a second portion of the light towards the optical sensor, wherein the projector is configured to adjust the light based on a change in position of the substrate relative to the projector as identified based on sensor data generated by the optical sensor in response to the second portion of the light.

24. The electronic device of claim 23, further comprising:
a first housing portion, wherein the substrate is mounted within the first housing portion; and
a second housing portion, wherein the projector and the optical sensor are mounted in the second housing portion, wherein the electronic device comprises a head mounted device having a frame, and wherein the second housing portion comprises a temple of the frame.

25. The electronic device of claim 23, wherein the first diffractive gratings comprise first holograms configured to replicate the light and the second diffractive gratings comprise second holograms configured to focus the replicated light onto the point as the first portion of the light, wherein the first holograms and the second holograms each comprise at least one hologram configured to diffract the light towards the optical sensor as the second portion of the light, and wherein the second portion of the light comprises infrared light and wherein the at least one hologram in the first holograms and the second holograms are configured to diffract the infrared light.

26. The electronic device of claim 23, wherein the projector is configured to adjust the light projected by the projector based on the change in position to compensate for a distortion in the first portion of the light produced by the change in position, and wherein the projector is configured to adjust the light by performing an operation selected from the group consisting of: adjusting an intensity of the light projected by the projector, adjusting a color of the light projected by the projector and adjusting a geometry of an optical component in the projector.

27. An optical combiner configured to receive light from a projector and configured to redirect the light onto a focal point, the optical combiner comprising:
an optical diffuser; and
a set of holograms overlapping the optical diffuser, wherein the optical diffuser is configured to receive the light at an angle external to a volume between the optical diffuser and the set of holograms, the optical diffuser is configured to replicate the light by diffracting the light over a plurality of angles towards the set of holograms, the light being Bragg-matched to the optical diffuser at the angle external to volume and at the plurality of angles, and the set of holograms is configured to focus, onto the focal point, the replicated light diffracted by the optical diffuser.

28. An electronic device comprising:
a projector configured to generate light;
a first layer of holograms configured to replicate the light by diffracting the light;
a mirror configured to reflect the light diffracted by the first layer of holograms; and
a second layer of holograms configured to focus, onto a focal point, the light diffracted by the first layer of holograms and reflected by the mirror.

29. The electronic device of claim 28, wherein the light is Bragg-matched to the first layer of holograms at input angles from the projector and at a plurality of output angles oriented towards the mirror.

30. The electronic device of claim 28, wherein the first layer of holograms comprise point-to-plane holograms and the second layer of holograms comprise plane-to-point holograms.

* * * * *